United States Patent
Tanaka et al.

[11] Patent Number: 5,989,747
[45] Date of Patent: Nov. 23, 1999

[54] CELL ELECTRODE WITH THICK TIP PORTIONS

[75] Inventors: Mitsutoshi Tanaka; Masashi Ishiyama; Yasuo Aotsuka; Seiji Ishizuka; Kenichi Fukumura; Yoshinobu Katagiri, all of Kanagawa, Japan

[73] Assignee: Fuji Photo Film Co., Ltd., Kanagawa, Japan

[21] Appl. No.: 08/891,347

[22] Filed: Jul. 10, 1997

[30] Foreign Application Priority Data

Jul. 10, 1996 [JP] Japan ................................. 8-181046
Nov. 13, 1996 [JP] Japan ................................. 8-318722
Nov. 18, 1996 [JP] Japan ................................. 8-306849

[51] Int. Cl.[6] ................................................. H01M 4/02
[52] U.S. Cl. ................... 429/231.95; 429/209; 429/224
[58] Field of Search ........................... 429/231.1, 231.2, 429/231.3, 233, 237, 231.95, 209

[56] References Cited

U.S. PATENT DOCUMENTS 3,790,409 2/1974 Fletcher et al. ................ 136/20
5,434,020 7/1995 Cooper ............................ 429/210
5,741,612 4/1998 Verhoog et al. ................. 429/235
5,780,181 7/1998 Idota et al. ...................... 429/194

FOREIGN PATENT DOCUMENTS 2466-870 4/1981 France .

*Primary Examiner*—Maria Nuzzolillo
*Assistant Examiner*—Monique M. Wills
*Attorney, Agent, or Firm*—Sughrue, Mion, Zinn, Macpeak & Seas, PLLC

[57] ABSTRACT

A cell electrode of a stripe rectangle shape having at least one electrode depolarizing mix layer on a current collector. The thickness of two end portions of the electrode depolarizing mix layer are thicker than an average thickness of the electrode depolarizing mix layer by 2 to 25%.

26 Claims, 11 Drawing Sheets

CELL ELECTRODE WITH THICK TIP PORTIONS

This application is based upon Japanese Patent Applications No. 8-181046 filed on Jul. 10, 1998, No. 8-318722 filed on Nov. 13, 1996, No. 8-306849 filed on Nov. 18, 1996, and No. 8-349966 filed on Dec. 27, 1996, the entire contents of which are incorporated herein by reference.

BACKGROUND OF THE INVENTION a) Field of the Invention

The present invention relates to an electrode capable of achieving a good cell performance, and more particularly to an electrode having good repetitive charge/discharge characteristics and to a non-aqueous electrolyte secondary cell using such an electrode.

b) Description of the Related Art

Secondary cells are widely used as power sources of electronic apparatuses of high quality and compact portable size. Of these secondary cells, recently developed lithium cells have a large capacity and a large output so that demands for these cells as power sources of portable electronic apparatuses are rapidly expanding. It is known, however, that the capacity of a secondary cell gradually lowers after charge and discharge are repeated.

The invention has been made in consideration of such circumstances and is based upon the finding that the tip portion of an electrode of the secondary cell has a high potential and because of this the capacity of the cell gradually lowers after repetitive charge/discharge cycles.

The electric conductivity of non-aqueous electrolyte used by a non-aqueous secondary cell is lower than that of aqueous or water-containing electrolyte. It is therefore necessary to broaden an electrode area. From this reason, a usual cylindrical non-aqueous secondary cell uses an electrode sheet which is wound in a cylindrical cell can. This electrode sheet has a thin film coated on one or both surfaces of a conductive support sheet, the thin film being made of a depolarizing mix (conductive materials of positive electrode active material, negative electrode material, conductivity-imparting material, binding material, and the like).

The electrode sheet is required to be electrically connected via a positive or negative electrode lead plate to a positive or negative electrode terminal of a cell so that a partial area of the conductive support sheet (usually one or both ends thereof) must be exposed for such electrical connection. In a usual electrode sheet, an exposed area not covered with the depolarizing mix layer is therefore formed to expose the conductive sheet.

A number of non-aqueous secondary cells are required to be mass produced with low cost in order to follow a recent expansion of cell application fields. To meet such requirements, electrode sheets are generally manufactured by coating a depolarizing mix layer of electrode materials on the surface of a stripe conductive sheet and thereafter cutting the sheets into separate electrode sheet pieces having a predetermined length. Even with such a electrode sheet manufacture method using the stripe conductive sheet and cutting it, it is obvious that the exposed area is required to be formed on the conductive sheet. Conventionally, the depolarizing mix layer is peeled off from the end portion of a cut electrode sheet. However, a work efficiency of this method is very bad and various other methods have been proposed.

According to a method described in JP-B-SHOU-55-31989, an adhesive tape is bonded to a partial area of a conductive sheet piece and a depolarizing mix layer is formed on the conductive sheet piece. Thereafter, the adhesive tape is peeled off to thereby form a partial area of the electrode sheet not covered with the depolarizing mix layer (an exposed area of the surface of the conductive sheet). This method is an improved method which mechanically peels off the depolarizing mix layer from the electrode sheet. However, this method is applied to each separate electrode sheet piece so that it is not suitable for mass production of electrode sheets.

According to JP-A-HEI-1-184069 and JP-A-HEI-1-194265, a doctor blade method is disclosed which has a shutter capable of controlling to intermittently supply coating liquid for forming an electrode depolarizing mix layer. Namely, with this doctor blade method, a stripe conductive sheet is coated with depolarizing mix layer pieces at an interval which leaves the non-coated areas between adjacent depolarizing mix layer pieces. These areas of the conductive sheet not coated with the depolarizing mix layer are used for electrical connection to positive or negative electrode plates.

This method is supposed to be theoretically suitable for mass production of electrode sheets. However, according to the teachings disclosed in JP-A-HEI-8-45501, boundaries between the areas of the electrode sheet covered with the depolarizing mix layer and the areas not covered with this layer become likely to be irregular, and in addition to this the thickness of the depolarizing mix layer becomes likely to be irregular.

This JP-A-HEI-8-45501 also discloses a method of coating a stripe conductive sheet with depolarizing mix layers at an interval which leaves the non-coated areas between adjacent depolarizing mix layers. In this method, liquid for forming a depolarizing mix layer on the surface of a stripe conductive sheet at a predetermined interval is supplied with an extrusion type injector having a slot nozzle. It is described in JP-A-HEI-8-45501 that use of such an injector can suppress irregularity of boundaries between the area covered with the depolarizing mix layer and the area not covered therewith and improve the uniformity of thickness of the depolarizing mix layer.

SUMMARY OF THE INVENTION

It is an object of the present invention to provide an electrode having good repetitive charge/discharge characteristics or a non-aqueous electrolyte secondary cell using such an electrode excellent in charge/discharge cycle characteristics.

It is another object of the present invention to provide a method of mass producing an electrode sheet with a depolarizing mix layer having a high uniformity of layer thickness, particularly of mass producing a stripe electrode sheet suitable for non-aqueous secondary cells, and manufacture apparatuses suitable for use with such a manufacture method.

According to one aspect of the invention, there is provided a cell electrode of a stripe rectangle shape having at least one electrode depolarizing mix layer on a current collector, wherein a thickness of the electrode depolarizing mix layer at one end portion is thicker than an average thickness of the electrode depolarizing mix layer by 2 to 25%.

Use of the depolarizing mix layer having a thick tip portion can provide a non-aqueous secondary cell having excellent charge/discharge cycle characteristics and high productivity.

According to another aspect of the invention, there is provided a secondary cell comprising: a first electrode of a rectangle shape having an electrode depolarizing mix layer on a current collector, a thickness of the electrode depolarizing mix layer at least one end portion being thicker than an average thickness of the electrode depolarizing mix layer by 2 to 25%; a second electrode of a rectangle shape having an electrode depolarizing mix layer on a current collector and an opposite polarity to the first electrode; a separator provided between the first and second electrodes; a container for housing the first and second electrodes and the separator; and electrolyte poured into the container.

According to a further aspect of the invention, there is provided a method of manufacturing an electrode sheet comprising the steps of: (a) sequentially bonding adhesive tape pieces to a strip conductive sheet on at least one surface thereof in the traverse direction of the sheet at a predetermined interval therebetween in the longitudinal direction of the sheet; (b) coating electrode depolarizing mix solution on the surface of the stripe conductive sheet where the adhesive tape piece was bonded, so as to expose at least one end portion of the adhesive tape sheet along the traverse direction of the sheet, and heating and drying the electrode depolarizing mix solution; and holding the exposed end portion of the adhesive tape piece and pulling up the exposed end portion along the traverse direction of the sheet to peel off the adhesive tape piece.

According to a still further aspect of the invention, there is provided an electrode sheet manufacturing system comprising: (a) an apparatus for sequentially bonding adhesive tape pieces to a strip conductive sheet on at least one surface thereof in the traverse direction of the sheet at a predetermined interval therebetween in the longitudinal direction of the sheet; (b) an apparatus for coating electrode depolarizing mix solution on the surface of the stripe conductive sheet where the adhesive tape piece was bonded, so as to expose at least one end portion of the adhesive tape sheet along the traverse direction of the sheet, while moving the stripe conductive sheet along he longitudinal direction; (c) an apparatus for heating and drying the stripe conductive sheet having an electrode depolarizing mix layer while moving the sheet along the longitudinal direction; and (d) an apparatus for holding the exposed end portion of the adhesive tape piece and pulling up the exposed end portion along the traverse direction of the sheet to peel off the adhesive tape piece.

DETAILED DESCRIPTION OF THE PREFERRED EMBODIMENTS

Figure 1A:
FIGS. 1A to 1C are schematic diagrams illustrating an electrode manufacture method.

Preferred embodiments of the invention have the following features. The invention is not limited to only these embodiments.

(A1) A cell electrode of a stripe rectangle shape having at least one electrode depolarizing mix layer on a current collector, wherein a thickness of the electrode depolarizing mix layer at one end portion is thicker than an average thickness of the electrode depolarizing mix layer by 2 to 25%.

(A2) The cell electrode described in (A1), wherein the end portion thicker than the average thickness of the electrode depolarizing mix layer is formed on both tip portions of the electrode in a longitudinal direction of the electrode.

(A3) The cell electrode described in (A1), wherein the end portion thicker than the average thickness of the electrode depolarizing mix layer is formed on both side end portions of the electrode in a width direction of the electrode.

(A4) The cell electrode described in (A1), wherein the end portion thicker than the average thickness of the electrode depolarizing mix layer is formed on both tip portions of the electrode in a longitudinal direction of the electrode and on both side end portions of the electrode in a width direction of the electrode.

(A5) The cell electrode described in one of (A1) to (A4), wherein a thickness of the electrode depolarizing mix layer at one end portion is thicker than an average thickness of the electrode depolarizing mix layer by 5 to 20%.

(A6) The cell electrode described in (A5), wherein a width of the one end portion thicker than the average thickness of the electrode depolarizing mix layer is 20 mm or narrower in the longitudinal direction and 10 mm or narrower in a width direction.

(A7) The cell electrode described in one of (A1) to (A6), wherein a distance between a peak position of the one end portion thicker than the average thickness of the electrode depolarizing mix layer and an end position of the electrode depolarizing mix layer is 10 mm or shorter.

(A8) The cell electrode described in one of (A1) to (A7), wherein a rise angle of a contour of the one end portion is 30 degrees or larger.

(A9) The cell electrode described in one of (A1) to (A8), wherein the end portion of the electrode depolarizing mix layer thicker than the average thickness thereof is formed by providing beforehand the current collector with a thick portion, coating electrode depolarizing mix material on the current collector, and removing the thick portion on the current collector and the electrode depolarizing mix material on the thick portion.

(A10) The cell electrode described in one of (A1) to (A9), wherein the electrode depolarizing mix layer contains positive electrode active material.

(A11) A secondary cell using the cell electrode described in one of (A1) to (A10).

(A12) A non-aqueous electrolyte secondary cell using the cell electrode described in one of (A1) to (A10).

(A13) A non-aqueous electrolyte secondary cell using the cell electrode described in one of (A1) to (A7), comprising a roll of a positive sheet electrode formed by coating a positive electrode depolarizing mix layer on a positive electrode current collector, a negative sheet electrode formed by coating a negative electrode depolarizing mix layer on a negative electrode current collector, and a microporous separator a negative sheet, wherein a length and a width of the positive electrode depolarizing mix layer are smaller than a length and a width of the negative electrode depolarizing mix layer and a thickness of the positive electrode depolarizing mix layer at the end portion is thicker than the average thickness of the positive electrode depolarizing mix layer.

(B1) A cell electrode of a stripe rectangle shape having at least one electrode depolarizing mix layer on a current collector, wherein a thickness of the electrode depolarizing mix layer at one end portion is thicker than an average thickness of the electrode depolarizing mix layer by 2 to 25%, and the one end portion has no protrusion.

(B2) The cell electrode described in (B1), wherein a distance L between a peak position of the one end portion of the electrode depolarizing mix layer thicker than the average thickness and a peripheral end point of the electrode depolarizing mix layer is 5 mm or shorter.

(B3) The cell electrode described in (B1), wherein a distance L between a peak position of the one end portion of the electrode depolarizing mix layer thicker than the average thickness and a peripheral end point of the electrode depolarizing mix layer is 2.5 mm or shorter.

(B4) The cell electrode described in (B2) or (B3), wherein if a cross section of the electrode depolarizing mix layer is approximated to a rectangle having a height equal to the average thickness of the electrode depolarizing mix layer, one side of the rectangle rising upright at a peripheral end point of the one end portion, an area S1 of the one end portion of the electrode depolarizing mix layer outside of the rectangle is 0.5 times or more or 5 times or less relative to an area S2 of the rectangle not including the one end portion.

(B5) The cell electrode described in (B2) or (B3), wherein if a cross section of the electrode depolarizing mix layer is approximated to a rectangle having a height equal to the average thickness of the electrode depolarizing mix layer, one side of the rectangle rising upright at a peripheral end point of the one end portion, an area S1 of the one end portion of the electrode depolarizing mix layer outside of the rectangle is 0.8 times or more or 1.2 times or less relative to an area S2 of the rectangle not including the one end portion.

(B6) The cell electrode described in any one of (B1) to (B5), wherein a radius of curvature of a peak portion of the one end portion of the electrode depolarizing mix layer is $\frac{1}{8} \times d$ or larger or $4 \times d$ or smaller, where $\underline{d}$ is the average thickness of the electrode depolarizing mix layer.

(B7) The cell electrode described in any one of (B1) to (B5), wherein a radius of curvature of a peak portion of the one end portion of the electrode depolarizing mix layer is $\frac{1}{2} \times d$ or larger or $\underline{d}$ or smaller, where $\underline{d}$ is the average thickness of the electrode depolarizing mix layer.

(B8) The cell electrode described in one of (B1) to (B7), wherein a border line of a surface of the current collector in contact with one side line of the electrode depolarizing mix layer is generally perpendicular to a longitudinal direction of the rectangular electrode.

(B9) The cell electrode described in one of (B1) to (B9), the one end portion of the electrode depolarizing mix layer is thicker than the average thickness by 2 to 25% at at least ⅓ the whole width of the electrode depolarizing mix layer, and the one end portion has no protrusion.

(B10) The cell electrode described in any one of (B1) to (B9), wherein the average thickness of the electrode depolarizing mix layer is 30 μm or thicker and 400 μm or thinner.

(B11) The cell electrode described in (B10), wherein the electrode depolarizing mix layer is made of positive electrode depolarizing mix for a lithium cell.

(B12) The cell electrode described in (B11), wherein the positive electrode active material contains at least one material selected from a compound group consisting of $Li_xCoO_2$, $Li_xNiO_2$, $Li_xCo_aNi_{1-a}O_2$, $Li_xCo_bV_{1-b}O_z$, $Li_xCo_bFe_{1-b}O_z$, $Li_xMn_2V_4$, $Li_xMnO_2$, $Li_xMn_2O_3$, $Li_xMn_bCo_{2-b}O_z$, $Li_xMn_bNi_{2-b}O_z$, $Li_xMn_bV_{2-b}O_z$ and $Li_xMn_bFe_{1-b}O_z$ (wherein x=0.05 to 1.2, a=0.1 to 0.9, b=0.8 to 0.98 and z=1.5 to 5).

(B13) A cell using the electrode described in any one of (B1) to (B12).

(B14) A non-aqueous electrolyte secondary cell using the cell electrode described in one of (B1) to (B10), comprising a roll of a positive sheet electrode formed by coating a positive electrode depolarizing mix layer on a positive electrode current collector, a negative sheet electrode formed by coating a negative electrode depolarizing mix layer on a negative electrode current collector, and a microporous separator a negative sheet, wherein a length and a width of the positive electrode depolarizing mix layer are smaller than a length and a width of the negative electrode depolarizing mix layer and a thickness of the positive electrode depolarizing mix layer at the end portion is thicker than the average thickness of the positive electrode depolarizing mix layer.

(C1) A method of manufacturing an electrode sheet comprising the steps of: (a) sequentially bonding adhesive tape pieces to a strip conductive sheet on at least one surface thereof in the traverse direction of the sheet at a predetermined interval therebetween in the longitudinal direction of the sheet; (b) coating electrode depolarizing mix solution on the surface of the stripe conductive sheet where the adhesive tape piece was bonded, so as to expose at least one end portion of the adhesive tape sheet along the traverse direction of the sheet without coating the solution on the side end portion of the sheet surface, and heating and drying the electrode depolarizing mix solution; and (c) holding the exposed end portion of the adhesive tape piece and pulling up the exposed end portion along the traverse direction of the sheet to peel off the adhesive tape piece.

(C2) An electrode sheet manufacturing system comprising: an apparatus for sequentially bonding adhesive tape pieces to a strip conductive sheet on at least one surface thereof in the traverse direction of the sheet at a predetermined interval therebetween in the longitudinal direction of the sheet; an apparatus for coating electrode depolarizing mix solution on the surface of the stripe conductive sheet where the adhesive tape piece was bonded, so as to expose at least one end portion of the adhesive tape sheet along the traverse direction of the sheet without coating the solution on the side end portion of the sheet surface, while moving the stripe conductive sheet along he longitudinal direction; an apparatus for heating and drying the stripe conductive sheet having an electrode depolarizing mix layer while moving the sheet along the longitudinal direction; and an apparatus for holding the exposed end portion of the adhesive tape piece and pulling up the exposed end portion along the traverse direction of the sheet to peel off the adhesive tape piece.

(C3) An electrode sheet manufacturing system for sequentially bonding a plurality of adhesive sheet pieces on a stripe conductive sheet, comprising: moving means for intermittently moving the stripe conductive sheet in a longitudinal direction of the sheet so as to repetitively and temporarily stop the sheet at a predetermined interval; and bonding means for sequentially bonding an adhesive tape piece to at least one surface of the stripe conductive sheet during the temporarily stop, in a traverse direction of the sheet.

(C4) An electrode sheet manufacturing system comprising: holding means for holding a laminated stripe conductive sheet member having a stripe conductive sheet, adhesive tape pieces bonded on the surface of the stripe conductive sheet along a width direction of the sheet at a predetermined interval in a longitudinal direction of the sheet, and an electrode depolarizing mix layer formed on the surface of the stripe conductive sheet and exposing at least one end portion of the adhesive tape piece along a traverse direction of the sheet and leaving the side end portion of the sheet member; and peel-off means for peeling off the adhesive tape piece by holding the exposed end portion of the adhesive tape piece and pulling up the exposed end portion in the traverse direction of the sheet.

(C5) The method of manufacturing an electrode sheet described in (C1), wherein the step (a) includes a step of bonding the adhesive tape piece on both opposite surfaces of the stripe conductive sheet.

(C6) The method of manufacturing an electrode sheet described in (C1), wherein the step (a) includes a step of bonding the adhesive tape piece whose adhesion force lowers during the heating process.

(C7) The method of manufacturing an electrode sheet described in (C1), further comprising the step of activating the surface of the stripe conductive sheet bonded with the adhesive tape piece, after the step (a).

(C8) The method of manufacturing an electrode sheet described in (C1), wherein the step (c) includes the step of holding the exposed area of the adhesive tape by suction through reduced pressure.

(C9) The method of manufacturing an electrode sheet described in (C11), wherein the step (c) includes the step of moving the stripe conductive sheet in the traverse direction while a roller is rotated.

(C10) The electrode sheet manufacturing system described in (C2), wherein the apparatus (d) is a roller peel-off apparatus having a reduced pressure suction surface capable of sucking an end portion of the adhesive tape piece, and moving being rotated in the traverse direction of the stripe conductive sheet.

(C11) The electrode sheet manufacturing system described in (C3), wherein the bonding means includes tape holding means for holding a stripe adhesive tape along the traverse direction of the sheet and being capable of moving back and forth relative to the surface of the sheet, and cutting means for cutting the strip adhesive tape held by the holding means in a predetermined length.

Embodiments of the invention will be detailed hereinunder.

In this specification a "thick" electrode depolarizing mix layer portion means not only a physically large dimension of thickness of this portion but also a large concentration of substance in this portion pertaining to electrode reaction (the substance being active material for a positive electrode, and material capable of absorption and release of lithium or the like for a negative electrode). If the pressure at a pressing process after an electrode depolarizing mix layer is coated and dried, is changed at the central area and tip portion of the layer, the thickness of the tip portion can be made large. However, in this case, the concentration of substance pertaining electrode reaction at the tip portion is not different from that at the central area, and it is not "thick" in the meaning defined in this specification. In this specification, the "positive" and "negative" electrodes mean positive and negative electrodes relative to the outer circuit of the cell.

A rectangular electrode can be formed by coating electrode depolarizing mix of electrode active materials on a current collector such as metal foil. The electrode depolarizing mix may comprise, in addition to electrode active materials or their precursor materials, a conductivity-imparting agent, a binder, a dispersant, a filler, an ionic conductivity-imparting agent, a pressure increasing agent, and various types of addition agents.

In order to coat the electrode depolarizing mix on the current collector, various types of coating methods may be used or electrode depolarizing mix compressed and press-molded may be coated. General coating method may be used, such as a reverse roll method, a direct roll method, a blade method, a knife method, an extrusion method, a curtain method, a gravure method, a bar method, a dip method, and a squeeze method Of these methods, the blade, knife and extrusion methods are more preferable. Electrode depolarizing mix may be coated on one surface of a current collector and then on the other surface thereof, or it may be coated on both surfaces at the same time.

Coating may be performed continuously, intermittently, or in a stripe manner. The thickness, length and width of a coated layer are determined from the size of a cell. The thickness of a coated layer on one surface is preferably 1 to 500 $\mu$m in a compressed state after drying.

A rectangular electrode is obtained by cutting an electrode sheet formed in the above manner. Any one of the following methods may be used for thickening a tip portion of the electrode depolarizing mix layer formed on a rectangular electrode. These methods are enumerated as in the following (1) to (7).

(1) Mechanical shaping. For example, after the end portions of an electrode depolarizing mix layer of uniform thickness are cut to expose electrode contact areas, the central area excepting the tip portions are abraded with a grinder. Alternatively, coated solution is moved toward the tip portions by blowing wind or the like before the coated solution is dried.

(2) Repetitive coating only on the tip portions. For example, coating solution is stripe-coated or screen-printed on the tip portions of an electrode depolarizing mix layer of uniform thickness.

(3) A slot used for extrusion coating or the like is shaped not uniform but large at its end portion to increase the extrusion flow rate at the end portion.

(4) The thickness at the tip portion is made large in a coating direction (e.g., in a longitudinal direction) by controlling a flow rate when a coater is mounted or dismounted.

(5) Controlling the material property of coating solution. For example, solution having high thixotropy is used to thicken an electrode depolarizing mix layer at the start and end of intermittent coating.

(6) After coating, end portions of a depolarizing mix layer electrode sheet are scratched off in the wet and the left portions are formed with thick portions.

(7) Electrode depolarizing mix is coated on a support having a step to form a gentle electrode depolarizing mix layer near the step and remove the electrode depolarizing mix layer formed on the upper surface of the step. This method will be detailed with reference to FIGS. 1A to 1C.

Figure 1B:
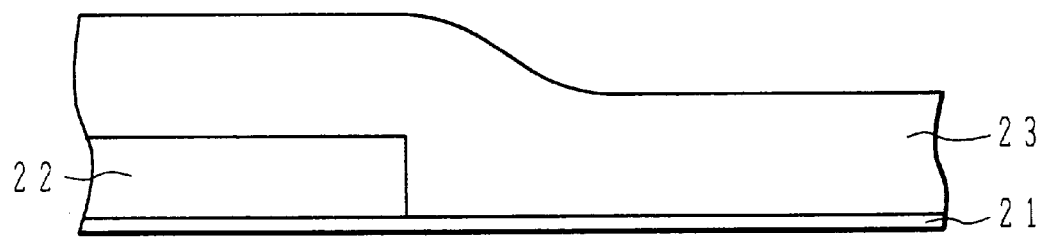
Figure 1C:
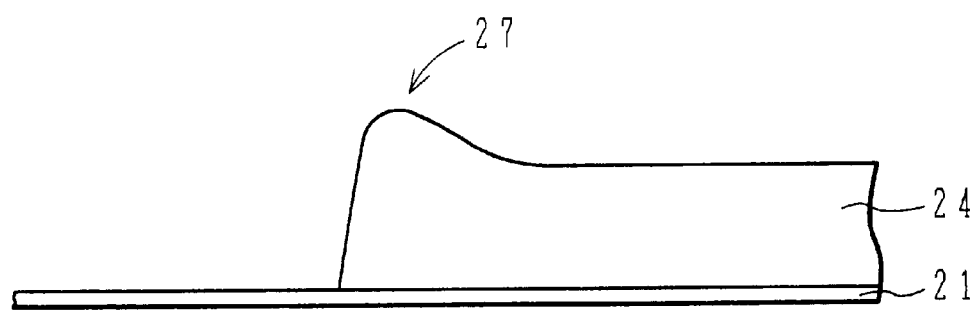

Of these methods, the method (7) is most preferable from the view point of manufacture processes and thickness control. This method is illustrated specifically in FIGS. 1A to 1C. As shown in FIG. 1A, for example, an adhesive tape 22 is adhered to a stripe conductive sheet (current collector) 21 used as an electrode. Next, as shown in FIG. 1B, electrode depolarizing mix 23 is coated on this sheet 21 and dried. Thereafter, the adhesive tape 22 is peeled off together with the electrode depolarizing mix 23. As shown in FIG. 1C, an electrode depolarizing mix layer 24 has a tip portion 27 thicker than the average thickness. The thickness of this portion of the electrode depolarizing mix layer 24 thicker than the average thickness can be controlled by a thickness of the tape 22.

The adhesive tape 22 provides a so-called masking tape function, and may be made of resin material, for example, polyolefine such as polyethylene and polypropylene, and polyester such as polyvinyl chloride and poplyethylene terephthalate. On one surface of the tape 11, an adhesive layer is formed. Various types of adhesive agents are already known and any one of them may be used. The adhesive agent is desired to have a proper adhesion force so as to make it easy to peel off the adhesive tape 22 from the current collector 21. This adhesive force is preferably 5 to 100 g/20 mm as measured by a 180-degree peel-apart method. It is also preferable that the adhesive agent has the characteristics that the adhesion force lowers at the heating temperature during the heating/dry process to be performed after forming the depolarized mix layer 23.

Figure 1D:
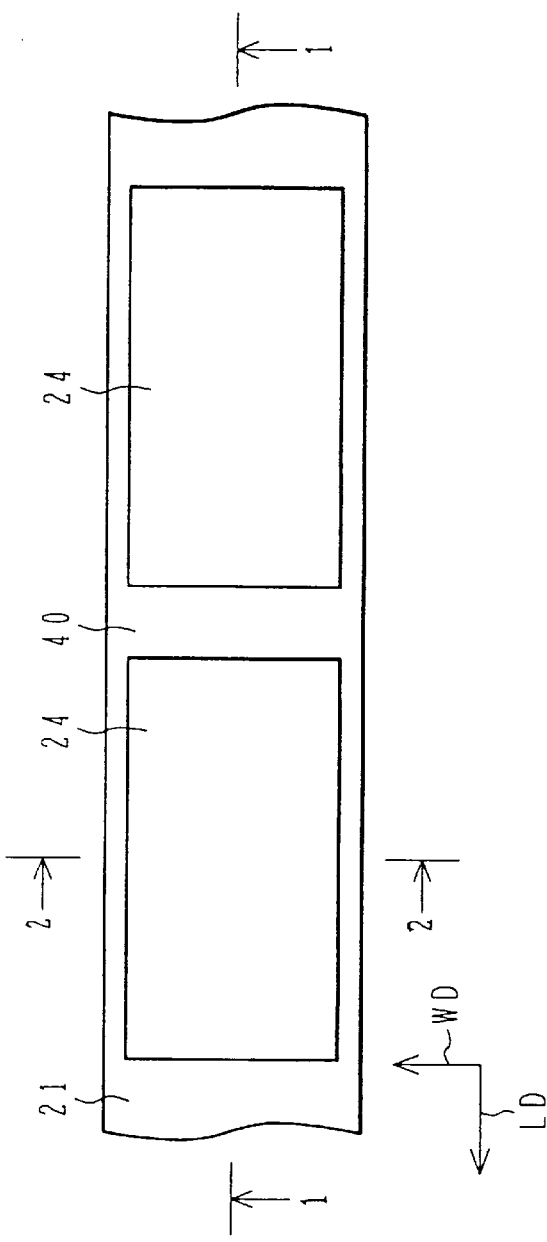
FIGS. 1D to 1F are schematic diagrams showing an electrode sheet after a depolarizing mix layer is formed thereon.

FIG. 1D is a plan view of an electrode sheet. Electrode depolarizing mix layers 24 are formed on a current collector 21 along the longitudinal direction LD of the electrode sheet at a predetermined interval. An exposed area 40 between adjacent electrode depolarizing mix layers 24 is formed by the above-described process of peeling off the adhesive tape together with a portion of the electrode depolarizing mix layer.

Figure 1E:
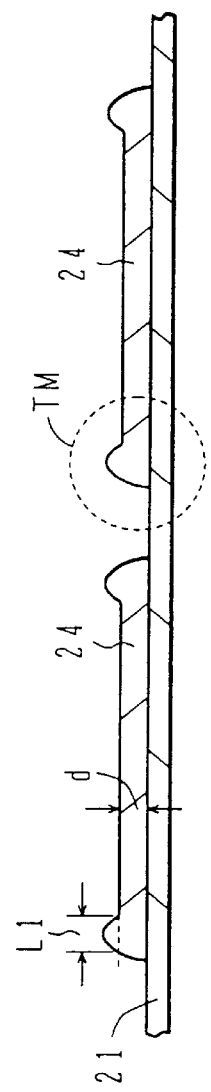

FIG. 1E is a cross sectional view of the electrode sheet shown in FIG. 1D taken along line 1—1. The electrode depolarizing mix layer 24 has a generally uniform thickness $\underline{d}$ excepting at its both tip portions. The average thickness of the electrode depolarizing mix layer 24 is approximately $\underline{d}$. The tip portions are thicker than the average thickness $\underline{d}$ as shown in FIG. 1C. The length of the thick tip portion in the longitudinal direction is L1.

Figure 1F:
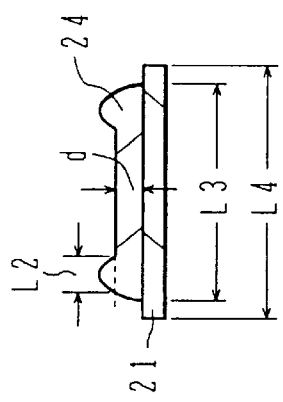

FIG. 1F is a cross sectional view of the electrode sheet taken along line 2—2. The electrode depolarizing mix layer 24 has a generally uniform thickness $\underline{d}$ excepting the portions on both sides thereof. The portions on both sides are thicker than the average thickness $\underline{d}$, which are supposed to be thickened by surface tension of coated electrode depolarizing mix. The length of the thick portions on both sides in the width direction is L2. The total width of the electrode depolarizing mix layer 24 is L3 (e.g., about 600 mm), and a width L4 of the current collector 21 is wider than L3 by 10 to 30 mm.

The electrode sheet shown in FIG. 1D is cut along the longitudinal direction LD and separated into a plurality of electrode sheets. The width of one electrode sheet is, for example, 56 mm. Both side end portions in the width direction shown in FIG. 1F may not be used and may not necessarily be cut off. Thereafter, the electrode sheet is cut along the width direction at the exposed area 40 to complete a separate electrode sheet for a cell.

The electrode depolarizing mix layer at its end portions in the longitudinal and width directions is preferably thicker than the average thickness $\underline{d}$ by 2 to 25%, and more preferably 5 to 20%.

The length of each end portion thicker than the average thickness $\underline{d}$ is preferably L1=0.5 to 20 mm or more preferably 1 to 15 mm in the longitudinal direction as shown in FIG. 1E, and preferably L2=0.5 to 10 mm or more preferably 1 to 15 mm in the width direction as shown in FIG. 1F.

It is preferable that each end portion of the electrode depolarizing mix layer 24 thicker than the average thickness $\underline{d}$ is formed on both sides of the electrode in the longitudinal direction and on both sides in the width direction. Namely, it is preferable that the thicker end portion is formed on all sides of the electrode depolarizing layer 24.

Figure 2A:
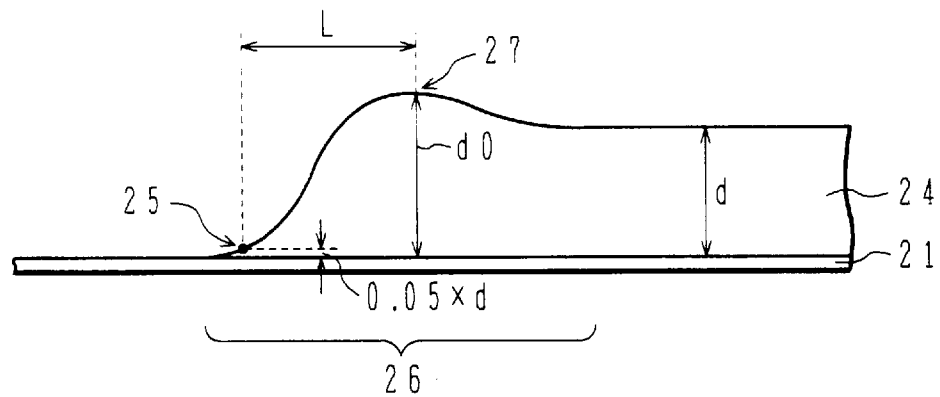
FIGS. 2A and 2B are cross sectional views of an electrode shown along its longitudinal direction.

FIG. 2A is an enlarged view of a tip portion TM as seen along the longitudinal direction shown in FIG. 1E. In this embodiment, a difference in the longitudinal direction between a peak position 27 of the tip portion thicker than the average thickness $\underline{d}$ of the electrode depolarizing mix layer 24 and a position of the end 25 of the electrode depolarizing mix layer is 10 mm or shorter, or preferably 5 mm or shorter, or more preferably 3 mm or shorter. The position of the end 25 of the electrode depolarizing mix layer is defined as a position of 5% of the average thickness d of the layer. The skirt of the end portion of the electrode depolarizing mix layer 24 may be made long or short. A rise angle of the tip portion 26 of the electrode depolarizing mix layer at the end 25 thereof is 30 degrees or larger, or preferably 45 degrees or larger, or more preferably 60 degrees or larger. The rise angle is defined by an angle of a straight line interconnecting the rising end 25 (5% of the average thickness $\underline{d}$) and a point which is 80% of the maximum thickness d0.

This electrode is very effective for cells, particularly for those cells having an area of the negative electrode opposing the positive electrode which is larger than the positive electrode area. The reason for this is not certain, but it is supposed that ion flow from the area of the negative electrode not facing the positive electrode is concentrated upon the positive electrode during the charge/discharge operation, and that potentials at end portions are raised abnormally to cause some unidentified phenomena.

FIG. 2A is a cross sectional view of the electrode as seen along the longitudinal direction. The electrode depolarizing mix layer 24 is formed on the current collector 21. The tip portion of the electrode depolarizing mix layer 24 has a thickness peak 27. This thickness d0 is preferably greater than the average thickness of the electrode depolarizing mix layer 24 by 2 to 25%, or more preferably by 5 to 20%. If the central area of the electrode depolarizing layer 24 except the tip portion 26 is generally uniform in thickness, the thickness of the central area of the electrode depolarizing mix layer 24 is approximately the average thickness $\underline{d}$ which is preferably 30 μm or larger and 400 μm or smaller.

Figure 2B:
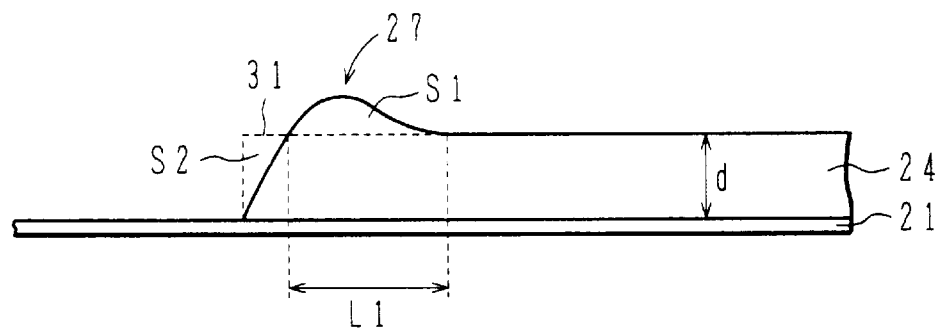

It is desired that the area of the thick end portions of the electrode depolarizing mix layer 24 is not too broad. As shown in FIG. 2B, the cross section of the tip portion of the electrode depolarizing mix layer 24 is assumed to be a rectangle 31 having a height equal to the average thickness $\underline{d}$, the one side of the rectangle rising upright at the end 25 of the tip portion. The area S1 of the electrode depolarizing mix layer 24 outside of the rectangle 31 is preferably 0.3 to 5 times the area S2 in the rectangle 31 without the tip portions, and more preferably 0.7 to 1.5 times, and most preferably 0.8 to 1.2 times.

It is preferable that the portion thicker than the average thickness $\underline{d}$ has no sharp projection. Such a sharp projection is often formed during the peel-off process using an adhesive tape. This projection is preferably to be mechanically removed. This removal may be performed by abrasion after drying the electrode depolarizing mix layer or by scratching before drying. For example, the electrode depolarizing mix layer may be mechanically abraded with a grinder or laser or water jet.

Assuming that the tip portion has no sharp projection, the apex angle of a triangle approximating the area S1 is 60 degrees or larger, or an angle between one of two sides forming the apex angle of the triangle and the presumably flat surface of the current collector to which the one side extends is 60 degrees or smaller. The thickness d0 of the peak 27 (FIG. 2A) is preferably greater than the average thickness $\underline{d}$ of the electrode depolarizing mix layer 24 by 2 to 25%. It is preferable that the tip portion has no sharp protrusion.

The radius of curvature of the peak portion 27 is preferably ⅛ to 4 times the average thickness $\underline{d}$, or more preferably ¼ to 2 times, or most preferably ½ to 1.

Figure 2C:
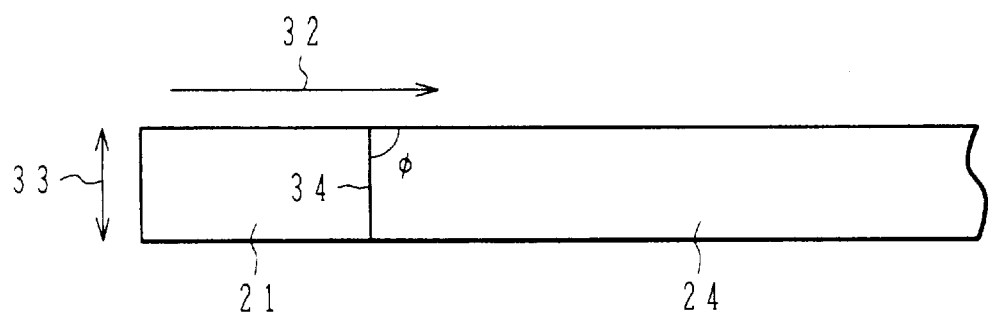
FIG. 2C is a plan view of the electrode.

FIG. 2C is a plan view of the electrode shown in FIG. 2B. The electrode depolarizing mix layer 24 is formed on the current collector 21. A cross line 34 between the electrode depolarizing mix layer 24 and the surface of the current collector 21 is generally at a right angle φ along the longitudinal direction 32. This angle φ is preferably 88° to 92°. The tip portion of the electrode depolarizing mix layer 24 is not necessarily required to be thicker than the average thickness $\underline{d}$ over the whole width, but portions thicker than the average thickness $\underline{d}$ may be distributed over the whole width. The tip portion of the electrode depolarizing mix layer 24 may be set thicker than the average thickness $\underline{d}$ at least to ⅓ the total width 33. The width of the electrode depolarizing mix layer 24 is vertical to the longitudinal direction 32 of the electrode sheet and corresponds to a length projected on the surface of the current collector 21.

The electrode having the above shape can be used both as positive and negative electrodes. It is preferable to make the negative electrode area broader than that of the positive electrode facing the negative electrode. The effects of the electrode of this embodiment will be described by using $LiCoO_2$ as positive active materials by way of example. During charging, lithium ions move from the positive electrode to the negative electrode. Since the negative electrode area is broader than the positive electrode area, a great amount of lithium ions move toward the negative electrode more than those from the central area of the positive electrode. Therefore, during the charging, the active material of the end portion of the positive electrode is represented by $Li_{1-x-d}CoO_2$ when the active material of the central area is represented by $Li_{1-x}CoO_2$, where $\underline{d}$ represents the amount of lithium excessively moved from the end portions of the positive electrode to the negative electrode. If the take-out amount of lithium is too large, the crystal structure of the positive active material such as $LiCoO_2$ is destroyed. It is therefore preferable that the take-out amount of lithium is small. The amount of lithium taken out of the positive electrode can be known by checking the positive electrode potential.

The reason why the tip portion of the electrode is preferably formed not to have sharp projections and to be smooth and thick may be ascribed to the following.

Figure 3:
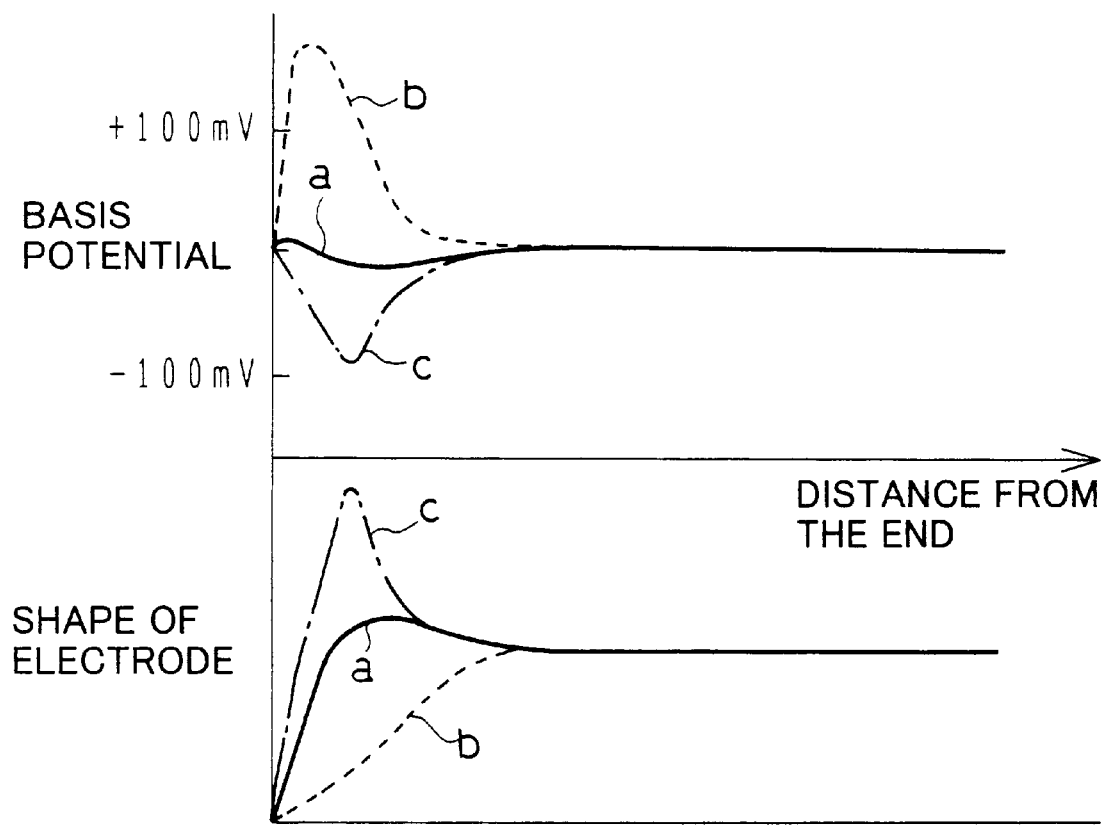
FIG. 3 shows the potential and shape of a positive electrode relative to a distance from one end of the depolarizing mix layer of the positive electrode.

FIG. 3 is a diagram showing the relationship between the potential of positive electrode (at the upper of FIG. 3) and the shape thereof (at the lower of FIG. 3), relative to a distance from the end of the positive electrode depolarizing mix layer. A broken line $\underline{b}$ indicates an electrode having the tip portion of the electrode depolarizing mix layer thinner than the average thickness. Since lithium is taken out more at the tip portion than the central area, this tip portion has a high potential. A one-dot chain line $\underline{c}$ indicates an electrode having the tip portion thicker than the average thickness and a sharp protrusion. Since the lithium take-out amount from the tip portion of the positive electrode is smaller than the central area, this tip portion has a potential lower than a reference potential of an embodiment electrode. However, the amount of lithium ions moving to the tip portion of the negative electrode is larger than the central portion, the negative electrode becomes more severe, and in some cases, lithium dendrite may be formed on the negative electrode which may cause small short circuits. A solid line $\underline{a}$ indicates an electrode having a tip portion of this embodiment. As shown, the positive electrode has generally flat characteristics of potential in the range from the end to the central area.

Figure 4:
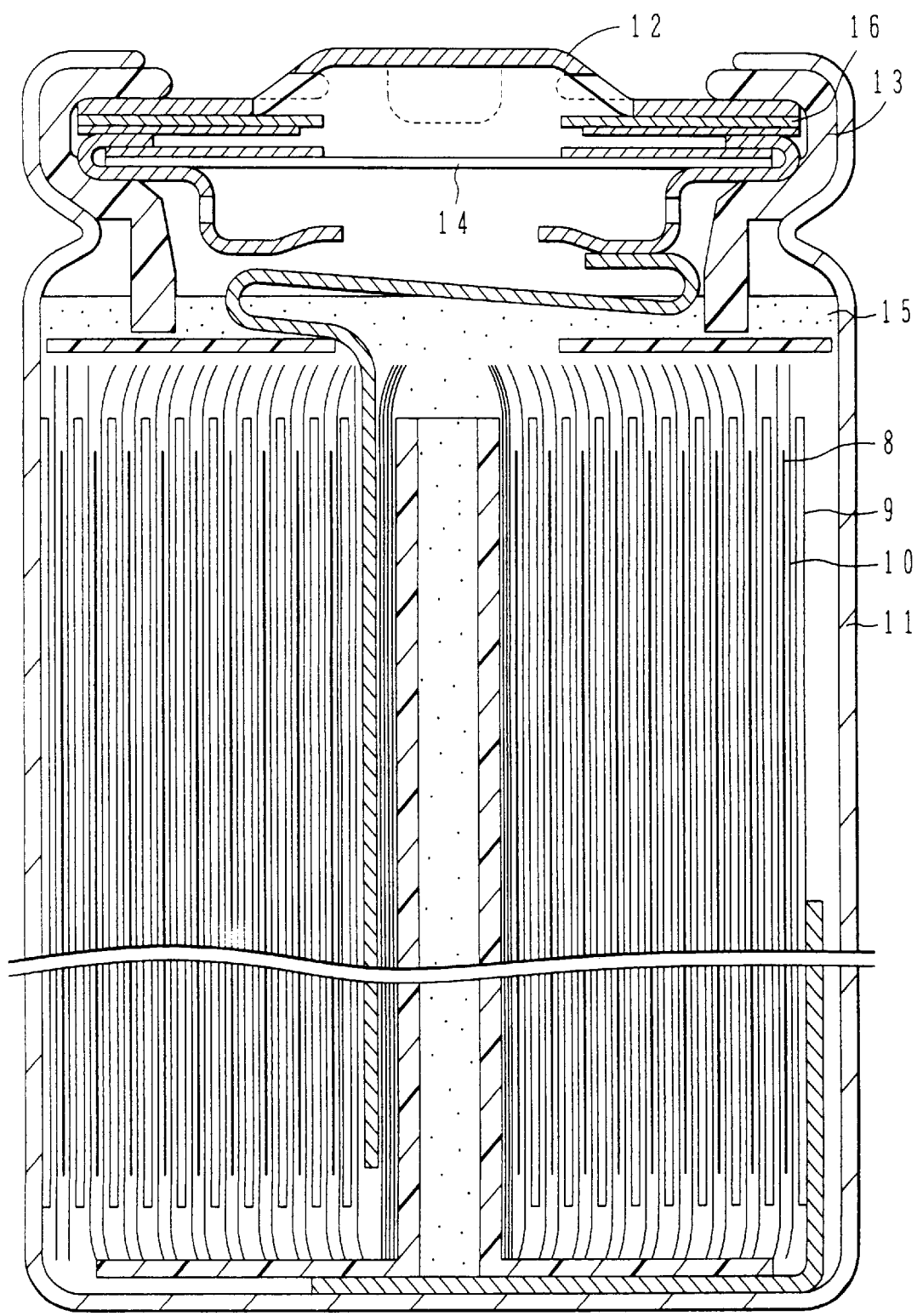
FIG. 4 is a cross sectional view of a cylindrical cell used for embodiments.

FIG. 4 is a cross sectional view of a cylinder type cell. The shape of the cell may be a cylinder or a square. Electrode sheets 8 and 9 together with a separator 10 are wound and inserted into a cell can 11. The negative sheet 9 is electrically connected to the can 11. Electrolyte 15 is permeated into the inside of the can 11 which is sealed with a terminal cap 12 to form a cell. The terminal cap 12 serves as the positive electrode terminal and is hermetically fitted in an upper opening of the can 11 by using a gasket 13. The positive sheet 8 is electrically connected to the terminal cap 12. A safety valve plate 14 is used as a sealing plate. It is preferable to use a positive temperature coefficient (PTC) element 16 for the safety of the cell.

The electrode sheets formed by the above-described coating method can be used for all cells using rectangular electrodes or electrode sheets. In the following a non-aqueous secondary battery using lithium as active materials will be detailed by way of example. The positive and negative electrodes of a non-aqueous secondary battery may be formed by coating the depolarizing mix of electrode active materials on a current collector (also serving as a support) with an extrusion type injector. The depolarizing mix for positive and negative electrodes may comprise a conductivity-imparting agent, a binder, a dispersant, a filler, an ionic conductivity-imparting agent, a pressure increasing agent, and various types of addition agents. After the depolarizing mix of electrode active materials are coated, it is dried, dehydrated and pressed to form electrode sheets.

The active materials for positive electrodes may be any materials which allow free absorption and release of a light metal. Lithium-containing transition metal oxides are preferably used as the positive electrode active materials, examples of which are $Li_xCoO_2$, $Li_xNiO_2$, $Li_xCo_aNi_{1-a}O_2$, $Li_xCo_bV_{1-b}O_z$, $Li_xCo_bFe_{1-b}O_2$, $Li_xMn_2VO_4$, $Li_xMnO_2$, $LiMn_2O_3$, $Li_xMn_bCo_{2-b}O_z$, $Li_xMn_bNi_{2-b}O_z$, $Li_xMn_bV_{2-b}O_z$ and $Li_xMn_bFe_{1-b}O_z$ (wherein x=0.05 to 1.2, a=0.1 to 0.9, b=0.8 to 0.98 and z=1.5 to 5).

The term "light metal" used herein means elements belonging to Group 1A (except for hydrogen) and Group 2A of Periodic Table, with lithium, sodium and potassium, in particular, lithium being preferred.

The negative electrode materials may be any material which allows free absorption and release of a light metal. Examples of such materials are preferably graphite (natural, artificially synthesized and vapor phase grown graphite), coke (derived from coal or petroleum), calcined products of organic polymers (resins or fibers of polyacrylonitrile, furan resins, cresol resins, phenolic resins), calcined products of mesophase pitch, metal oxides, metal chalcogenides, and lithium-containing transition metal oxides and chalcogenides.

Oxides and chalcogenides are preferably made of a material or a combination of materials selected from a group consisting of Ge, Sn, Pb, Bi, Al, Ga, Si and Sb. Amorphous oxides and chalcogenides added with network formers such as $SiO_2$, $B_2O_3$, $P_2O_5$, $Al_2O_3$ and $V_2O_5$ are more preferable. These materials may be stoichiometric compounds or non-stoichiometric compounds.

Preferable examples of such compounds are enumerated in the following only for illustrative purpose.

GeO, $GeO_2$, SnO, $SnO_2$, $SnSiO_3$, PbO, SiO, $Sb_2O_5$, $Bi_2O_3$, $Li_2SiO_3$, $Li_4Si_2O_7$, $Li_2GeO_3$, $SnAl_{0.4}B_{0.5}P_{0.5}K_{0.1}O_{3.65}$, $SnAl_{0.4}B_{0.5}P_{0.5}Cs_{0.1}O_{3.65}$, $SnAl_{0.4}B_{0.5}P_{0.5}K_{0.1}Ge_{0.05}O_{3.85}$, $SnAl_{0.4}B_{0.5}P_{0.5}K_{0.1}Mg_{0.1}Ge_{0.02}O_{3.83}$, $SnAl_{0.4}B_{0.4}P_{0.4}Ba_{0.08}O_{3.28}$, $SnAl_{0.5}B_{0.4}P_{0.5}Mg_{0.1}F_{0.2}O_{3.65}$, $SnAl_{0.4}B_{0.5}P_{0.5}Cs_{0.1}Mg_{0.1}F_{0.2}O_{3.65}$, $SnB_{0.5}P_{0.5}Cs_{0.05}Mg_{0.05}F_{0.1}O_{3.03}$, $Sn_{1.1}Al_{0.4}B_{0.4}P_{0.4}Ba_{0.08}O_{3.34}$, $Sn_{1.2}Al_{0.5}B_{0.3}P_{0.4}Cs_{0.2}O_{3.5}$, $SnSi_{0.5}Al_{0.2}B_{0.1}P_{0.1}Mg_{0.1}O_{2.8}$, $SnSi_{0.5}Al_{0.3}B_{0.4}P_{0.5}O_{4.30}$, $SnSi_{0.6}Al_{0.1}B_{0.1}P_{0.1}Ba_{0.2}O_{2.95}$, $SnSi_{0.6}Al_{0.4}B_{0.2}Mg_{0.1}O_{3.2}$, $Sn_{0.9}Mn_{0.3}B_{0.4}P_{0.4}Ca_{0.1}Rb_{0.1}O_{2.95}$, $Sn_{0.9}Fe_{0.3}B_{0.4}P_{0.4}Ca_{0.1}Rb_{0.1}O_{2.95}$, $Sn_{0.3}Ge_{0.7}Ba_{0.1}P_{0.9}O_{3.35}$, $Sn_{0.9}Mn_{0.1}Mg_{0.1}P_{0.9}O_{3.35}$, and $Sn_{0.2}Mn_{0.8}Mg_{0.1}P_{0.9}O_{3.35}$.

The negative electrode material may contain light metal, particularly lithium. Lithium is preferably added electrochemically, chemically or thermally.

The amount of lithium added to the negative electrode material approximately corresponds to a lithium deposition potential. Lithium of 50 to 700 mol % is preferably added to the negative electrode material. Lithium of 100 to 600 mol % is more preferable.

The conductivity-imparting agent for positive and negative electrodes may be graphite, acetylene black, carbon black, ketchen black, carbon fibers, metal powders, metal fibers or polyphenylene derivatives. Of these materials, graphite and acetylene black are particularly preferred.

The binder for positive and negative electrodes may be polyacrylic acid, carboxymethyl cellulose, polytetrafluoroethylene, polyvinylidene fluoride, polyvinyl alcohol, starch, regenerated cellulose, diacetyl cellulose, hydroxypropyl cellulose, polyvinyl chloride, polyvinyl pyrrolidone, polyethylene, polypropylene, styrene-butadiene rubber (SBR), etylene-propylene-diene methylene linkage (EPDM), sulfonated EPDM, fluororubber, polybutadiene or polyethlene oxide. Of these materials, polyacrylic acid, carboxymethyl cellulose, polytetrafluoroethylene and polyvinylidene fluoride are particularly preferred. These materials are preferably used as water dispersed latex having a grain size of 1 micron or smaller.

Materials for supports or current collectors of the positive and negative electrodes may be aluminum, stainless steel, nickel, titanium or alloys thereof, for the positive electrode, and copper, stainless steel, nickel, titanium or alloys thereof, for the negative electrode. The support may have a shape such as a foil, expanded metal, punching metal or net. In particular, preferred are an aluminum foil for the positive electrode and a copper foil for the negative electrode.

The separator may be any insulating thin film having a high ion-permeability and desired mechanical strength and examples of materials for the separator include olefine polymers, fluoropolymers, cellulosic polymers, polyimides, polyamides, glass fibers and alumina fibers which may be used in the form of nonwoven fabrics, woven fabrics and microporous films. In particular, preferred materials are polypropylene, polyethylene, mixture of polypropylene and Teflon (registered trademark) and mixture of polyethylene and Teflon and preferred shapes of the separator include microporous films. Particularly preferred are microporous films each having a pore size ranging from 0.01 to 10 $\mu$m and a thickness ranging from 5 to 50 $\mu$m.

The electrolytes usable therein are those obtained by dissolving at least one electrolyte selected from the group consisting of $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lithium salts of lower aliphatic carboxylic acids, $LiAlCl_4$, LiCl, LiBr, LiI, chloroborane lithium salt and lithium tetraphenylborate in an organic solvent comprising at least one member selected from the group consisting of propylene carbonate, ethylene carbonate, butylene carbonate, dimethyl carbonate, diethyl carbonate, 1,2-dimethoxyethane, $\gamma$-butyrolactone, tetrahydrofuran, 2-methyl tetrahydrofuran, dimethylsulfoxide, dioxolan, 1,3-dioxolan, formamide, dimethylformamide, nitromethane, acetonitrile, methyl formate, methyl acetate, methyl propionate, phosphoric acid triesters, trimethoxymethane, dioxolan derivatives, sulfolane, 3-methyl-2-oxazolidinone, propylene carbonate derivatives, tetrahydrofuran derivatives, diethyl ether and 1,3-propanesultone. Preferred are those obtained by dissolving $LiCF_3SO_3$, $LiClO_4$, $LiBF_4$ and/or $LiPF_6$ in a mixed solvent comprising propylene carbonate or ethylene carbonate and 1,2-dimethoxyethane and/or diethyl carbonate and, in particular, the electrolyte preferably comprises at least ethylene carbonate and $LiPF_6$.

Materials for the can of a cell having the bottom may be, for instance, nickel-plated steel plates, stainless steel plates (such as SUS 304, SUS 304L, SUS 304N, SUS 316, SUS 316L, SUS 430 and SUS 444), nickel-plated stainless steel plates (such as those listed above), aluminum or alloys thereof, nickel, titanium and copper, which may be in the form of cylinders having a circular-section, elliptic-section, square-section and rectangular-section. In particular, if the cell can simultaneously serves as a negative terminal, stainless steel plates and nickel-plated steel plates are preferred. While if the cell can simultaneously serves as a positive terminal, stainless steel plates, aluminum or alloys thereof are preferred.

The gaskets may be those prepared from olefinic polymers, fluoropolymers, cellulosic polymers, polyimides and polyamides, with olefinic polymers and particularly polymers mainly of propylene being preferred because of high resistance to organic solvents and low water-permeability, and block copolymers of propylene and ethylene being more preferred.

The cell is, if necessary, covered with an armoring material. Examples of such armoring materials are heat-shrinkable tubings, adhesive tapes, metal films, paper, cloths, paint and plastic cases. The armor may be partially composed of a portion which undergoes color change upon heating so that the heat history of the cell during use can be monitored.

A plurality of cells are optionally combined in series or parallel and accommodated in a cell-package. The cell package may be provided with a resistor having a positive temperature coefficient, a temperature fuse and safety elements such as a fuse and/or a current cutoff element as well as a safety circuit (i.e., a circuit having functions for monitoring, for instance, the voltage, temperature and current of each cell and/or a cell assembly and, if necessary, a circuit for cutting off the current). In addition, the cell package may comprise, in addition to positive and negative terminals for the entire cell assembly, external terminals such as positive and negative terminals for each cell, temperature-detecting terminals for the cell assembly and/or each cell and a current-detecting terminal for the cell assembly. Moreover, the cell package may comprise a built-in voltage-conversion circuit (such as DC-DC converter). Further, the connection of each cell may be performed by fixing the cell through welding the lead plate thereof or by fixing it through the use of, for instance, a socket so that it is easily removable. Moreover, the cell package may have a function for displaying the remaining capacity thereof, necessity of charging, number of use or the like.

The cell can be used in various apparatuses. In particular, the cell is preferably used in video movies, portable video decks provided with built-in monitors, movie cameras provided with built-in monitors, compact cameras, single-lens reflex cameras, disposable cameras, films provided with lenses, notebook-type personal computers, notebook-type word processors, electronic notebooks, portable telephones, cordless telephones, shavers, motor-driven tools, motor-driven mixers and motorcars.

The present invention will be described in more detail with reference to the following embodiments. The invention is not restricted to these specific embodiments, but should include various modifications so far as they are not beyond the scope of the present invention.

1st Embodiment

The positive electrode was prepared by mixing 87 parts by weight of $LiCoO_2$ as active material, 6 parts by weight of black lead scales and 3 parts by weight of acetylene black as conductivity-imparting agents, and 3 parts by weight of polytetrafluoroethylene dispersed with water and one sodium polyacrylic acid as binders, kneading the mixture together with water as a medium to give a slurry, then applying the slurry onto both sides of an aluminum foil (current collector, thickness: 20 $\mu$m) by an extrusion method, drying the coated slurry, compression-molding the current collector using a calendar press, and cutting the current collector to give a sheet-like positive electrode (C-1) having a width of 56 mm, a length of 400 mm and a thickness of 250 $\mu$m. This positive electrode was given a thickness distribution to be described later.

In order to form the negative electrode, negative electrode material was prepared by dry-mixing 73.3 parts by weight of carbon monoxide tin, 19.5 parts by weight of carbon dioxide silicon, 3.5 parts by weight of magnesium oxide and 3.7 parts by weight of boron oxide, baking the mixture for 10 hours at 1200° under an argon atmosphere, cooling and pulverizing the mixture to give $SnSi_{0.6}Mg_{0.2}B_{0.2}O_{2.7}$ having an average grain size of 4.5 $\mu$m.

Next, the negative electrode was prepared by adding, to 88 parts by weight of the negative electrode material, 6 parts by weight of black lead scales as conductivity-imparting agents, 4 parts by weight of polyvinylidene fluoride, 1 part by weight of carboxymethyl cellulose and 1 part by weight of lithium acetate as binders, kneading the mixture together with water as a medium to give a slurry, then applying the slurry onto both sides of a copper foil (current collector, thickness: 18 $\mu$m) by an extrusion method, drying the coated slurry, compression-molding and cutting the current collector to give a sheet-like negative electrode (A-1) having a width of 58 mm, a length of 440 mm and a thickness of 78 $\mu$m.

Before the above-described cutting process, the positive and negative electrodes were dried and dehydrated in a low humidity atmosphere (dew point: −50° C.) for 2 hours at 200 to 250° C. with a far infrared heater. Thereafter, a nickel lead plate was ultrasonic-welded to the negative electrode sheet at the area not covered with the electrode depolarizing mix layer. A lead plate was ultrasonic-welded to the aluminum current collector (positive electrode current collector) of 20 $\mu$m thick at the exposed area. The welded portions of the leads were protected by attaching an adhesive tape made of polyimide as a base material and silicon-containing adhesive agent. As shown in FIG. 4, the positive electrode sheet 8 with the lead, a microporous polyethylene film separator 10 and the negative electrode sheet 9 with the lead were stacked one upon another and wound by a winding machine.

This wound roll was housed in a cylindrical cell can 11 having a bottom and made of nickel plated iron. Electrolyte 15 was poured into the cell can 11. The electrolyte contained 0.9 mol $LiPF_6$ and 0.1 mol $LiBF_4$ per one litter and solvent of ethylene carbonate, dimethyl carbonate, diethyl carbonate and ethyl propionate with a volume ratio of 2:4:3:1. A cell lid 12 having a positive terminal was caulked to the cell can 11 via a gasket 13 to form a cylindrical cell. At earlier process stages, the positive terminal 12 was connected to a positive electrode sheet 8 and the cell can was connected to a negative electrode sheet 9 by lead wires. With the above processes, a cell (D-1) was formed. Reference numeral 14 represents a safety valve.

Positive electrode C-2 to C-10 were formed by changing the film thickness TH1 at the central area of the stripe positive electrode C-1 and the film thickness at the tip portion as shown in Table 1. The film thickness was changed by coating the layer to a tip portion thickness and then abrading the layer at the area other than the tip portion. The film thickness at one tip portion of the positive electrode along the longitudinal direction is TH2, and the length thereof is WD2. The film thickness at the other tip portion of the positive electrode along the longitudinal direction is TH3, and the length thereof is WD3. The film thickness at one side portion of the positive electrode along the width direction is TH4, and the length thereof is LN4. The film thickness at the other side portion of the positive electrode along the width direction is TH4, and the length thereof is LN5.

TABLE 1

| Positive electrode No. | TH1 ($\mu$m) | TH2/WD2 ($\mu$m/mm) | TH3/WD3 ($\mu$m/mm) | TH4/LN4 ($\mu$m/mm) | TH5/LN5 ($\mu$m/mm) |
|---|---|---|---|---|---|
| C-1 | 250 | 250/— | 250/— | 250/— | 250/— |
| C-2 | 250 | 315/8 | 250/— | 250/— | 250/— |
| C-3 | 250 | 290/25 | 250/— | 250/— | 250/— |
| C-4 | 250 | 290/8 | 250/— | 250/— | 250/— |
| C-5 | 250 | 290/8 | 290/8 | 250/— | 250/— |
| C-6 | 250 | 290/8 | 290/8 | 290/4 | 290/4 |
| C-7 | 250 | 300/8 | 300/8 | 300/4 | 300/4 |
| C-8 | 250 | 275/8 | 275/8 | 275/4 | 250/4 |
| C-9 | 250 | 265/8 | 265/8 | 265/4 | 265/4 |
| C-10 | 250 | 260/8 | 260/8 | 260/4 | 260/4 |

Using the positive electrodes C-2 to C-10 instead of the positive electrode C-1, cells D-2 to D-10 were manufactured in the manner similar to the cell D-1.

The charge/discharge conditions were set to 4.2 to 2.7 V at 1.4 mA/cm$^2$. The results are shown in Table 1. The charge/discharge cycle performance was represented by a relative value indicating the number of cycles at which the discharge capacity becomes 8.5% of the first discharge capacity, relative to the number of cycles required for the cell D-1.

TABLE 2

| Cell No. | Positive Electrode No. | Cycle Performance Relative Value |
|---|---|---|
| D-1 | C-1 | 1.00 |
| D-2 | C-2 | 0.93 |
| D-3 | C-3 | 1.02 |
| D-4 | C-4 | 1.04 |
| D-5 | C-5 | 1.06 |
| D-6 | C-6 | 1.07 |
| D-7 | C-7 | 1.05 |
| D-8 | C-8 | 1.05 |
| D-9 | C-9 | 1.04 |
| D-10 | C-10 | 1.02 |

It was confirmed that the cells D-3 to D-10 using the electrodes C-3 to C-10 with a thick tip portion of the electrode had improved charge/discharge cycle characteristics as compared to the cells D-1 and D-2.

2nd Embodiment

The positive electrodes of the first embodiment were formed by abrading the central area of the electrode except the tip portions thereof. In this embodiment, an adhesive tape 22 such as shown in FIGS. 1A to 1C was bonded beforehand to an electrode current collector 21. After electrode depolarizing mix 23 was coated and dried, the adhesive tape 22 was peeled off to form positive electrodes C-11 to C-20 with thick tip portions shown in Table 3. The adhesive tape used was made of polyethylene terephthalate as its base material and acrylic-containing adhesive agent (adhesion force of 8 g/20 mm by a 180-degree peel-apart method, and a thickness of 20 $\mu$m). The thickness of the tip portion was controlled by changing the thickness of the adhesive tape and the viscosity of electrode depolarizing mix solution.

TABLE 3

| Positive electrode No. | TH1 ($\mu$m) | TH2/WD2 ($\mu$m/mm) | TH3/WD3 ($\mu$m/mm) | TH4/LN4 ($\mu$m/mm) | TH5/LN5 ($\mu$m/mm) |
|---|---|---|---|---|---|
| C-11 | 250 | 250/— | 250/— | 250/— | 250/— |
| C-12 | 250 | 315/0.2 | 315/0.2 | 250/— | 250/— |
| C-13 | 250 | 290/0.1 | 290/0.1 | 250/— | 250/— |
| C-14 | 250 | 275/0.1 | 275/0.1 | 250/— | 250/— |
| C-15 | 250 | 263/0.05 | 263/0.05 | 250/— | 250/— |
| C-16 | 250 | 255/0.05 | 255/0.05 | 250/— | 250/— |
| C-17 | 250 | 290/0.1 | 290/0.1 | 290/0.1 | 290/0.1 |
| C-18 | 250 | 275/0.1 | 275/0.1 | 275/0.1 | 275/0.1 |
| C-19 | 250 | 265/0.05 | 265/0.05 | 265/0.05 | 265/0.05 |
| C-20 | 250 | 260/0.05 | 260/0.05 | 260/0.05 | 260/0.05 |

Cells D-11 to D-20 were manufactured by using the positive electrodes C-11 to C-20 in the manner similar to the first embodiment, and the charge/discharge tests were conducted similar to the first embodiment.

TABLE 4

| Cell No. | Positive Electrode No. | Cycle Performance Relative Value |
|---|---|---|
| D-11 | C-11 | 1.00 |
| D-12 | C-12 | 0.93 |
| D-13 | C-13 | 1.05 |
| D-14 | C-14 | 1.06 |
| D-15 | C-15 | 1.05 |
| D-16 | C-16 | 1.03 |
| D-17 | C-17 | 1.05 |
| D-18 | C-18 | 1.08 |
| D-19 | C-19 | 1.07 |
| D-20 | C-20 | 1.05 |

It was confirmed that the cells D-13 to D-20 using the electrodes C-13 to C-20 with the thick tip portions had improved charge/discharge cycle characteristics as compared to the cells D-11 and D-12.

Embodiments of electrodes with and without protrusions formed on the tip portion will be described.

3rd Embodiment

The positive electrode was prepared by mixing 87 parts by weight of LiCoO$_2$ as active material, 6 parts by weight of black lead scales and 3 parts by weight of acetylene black as conductivity-imparting agents, and 3 parts by weight of polytetrafluoroethylene dispersed with water and one sodium polyacrylic acid as binders, kneading the mixture together with water as a medium to give a slurry, then applying the slurry onto both sides of an aluminum foil (current collector, thickness: 20 $\mu$m) by an extrusion method, drying the coated slurry, compression-molding the current collector using a calendar press, and cutting the current collector to give a sheet-like positive electrode (C-1) having a width of 56 mm, a length of 400 mm and a thickness of 250 $\mu$m. In order to shape the tip portion of this embodiment, an adhesive tape of polypropylene having a thickness of 20 $\mu$m to 50 $\mu$m was adhered to the aluminum foil (current collector) still not coated with the electrode depolarizing mix, at the end portion thereof perpendicularly to the longitudinal direction of the aluminum foil. After the electrode depolarizing mix was coated and dried, the adhesive tape was peeled off and then the electrode was physically abraded to a desired shape with a grinder and punched out. The shapes of the obtained positive electrodes C-2 to C-10 are shown in Table 5. As shown in FIG. 2A, $\underline{d}$ is a thickness of the central area of the electrode and corresponds to the average film thickness. d0 is a film thickness of the tip portion of the electrode. L is a distance from the end 25 of the electrode depolarizing mix layer to the peak position 27. S1/S2 is a ratio of the area S1 to the area S2 shown in FIG. 2. A radius of curvature of the contour near at the peak 27 is represented by $\underline{r}$.

TABLE 5

| Film Thickness of Positive Electrode and Shape of Tip Portion | | | | | |
|---|---|---|---|---|---|
| Positive Electrode No. | d ($\mu$m) | d0 ($\mu$m) | L (mm) | S1/S2 | r |
| C-1 | 250 | 250 | | | |
| C-2 | 250 | 290 | 0.5 | 2 | projection |
| C-3 | 250 | 290 | 10 | 10 | 5d |
| C-4 | 250 | 290 | 0.5 | 10 | 2d |

TABLE 5-continued

Film Thickness of Positive Electrode and Shape of Tip Portion

| Positive Electrode No. | d ($\mu$m) | d0 ($\mu$m) | L (mm) | S1/S2 | r |
|---|---|---|---|---|---|
| C-5 | 250 | 290 | 0.5 | 2 | 2d |
| C-6 | 250 | 290 | 1.0 | 3 | 2d |
| C-7 | 250 | 290 | 2.0 | 4.5 | 3d |
| C-8 | 250 | 290 | 0.2 | 2 | 2d |
| C-9 | 250 | 270 | 0.2 | 2 | 2d |
| C-10 | 250 | 290 | 0.2 | 0.8 | 4d |
| C-11 | 250 | 320 | 0.5 | 2 | 1.5d |

In order to form the negative electrode, negative electrode material was prepared by dry-mixing 73.3 parts by weight of carbon monoxide tin, 19.5 parts by weight of carbon dioxide silicon, 3.5 parts by weight of magnesium oxide and 3.7 parts by weight of boron oxide, baking the mixture for 10 hours at 1200° under an argon atmosphere, cooling and pulverizing the mixture to give $SnSi_{0.6}Mg_{0.2}B_{0.2}O_{2.7}$ having an average grain size of 4.5 $\mu$m. Next, the negative electrode was prepared by adding, to 88 parts of the negative electrode material, 6 parts by weight of black lead scales as conductivity-imparting agents, 4 parts by weight of polyvinylidene fluoride, 1 part by weight of carboxymethyl cellulose and 1 part by weight of lithium acetate as binders, kneading the mixture together with water as a medium to give a slurry, then applying the slurry onto both sides of a copper foil (current collector, thickness: 18 $\mu$m) by an extrusion method, drying the coated slurry, compression-molding and cutting the current collector to give a sheet-like negative electrode (A-1) having a width of 58 mm, a length of 440 mm and a thickness of 78 $\mu$m.

Before the above-described cutting process, the positive and negative electrodes C-1 and A-1 were dried and dehydrated in a low humidity atmosphere (dew point: –50° C.) for 2 hours at 200 to 250° C. with a far infrared heater. Thereafter, a nickel lead plate was ultrasonic-welded to the negative electrode sheet at the area not covered with the electrode depolarizing mix layer. A lead plate was ultrasonic-welded to the aluminum current collector (positive electrode current collector) of 20 $\mu$m thick at the exposed area. The welded portions of the leads were protected by attaching an adhesive tape made of polyimide as a base material and silicon-containing adhesive agent. As shown in FIG. 4, the positive electrode sheet 8 with the lead, a microporous polyethylene film separator 10 and the negative electrode sheet 9 with the lead were stacked one upon another and wound by a winding machine.

This wound roll was housed in a cylindrical cell can 11 having a bottom and made of nickel plated iron. Electrolyte 15 was poured into the cell can 11. The electrolyte contained 0.9 mol $LiPF_6$ and 0.1 mol $LiBF_4$ per one litter and solvent of ethylene carbonate, dimethyl carbonate, diethyl carbonate and ethyl propionate with a volume ratio of 2:4:3:1. A cell lid 12 having a positive terminal was caulked to the cell can 11 via a gasket 13 to form a cylindrical cell. At earlier process stages, the positive terminal 12 was connected to a positive electrode sheet 8 and the cell can was connected to a negative electrode sheet 9 by lead wires. Reference numeral 14 represents a safety valve. With the above processes, a cell D-1 was manufactured.

By using the positive electrodes C-2 to C-11 shown in Table 5, cells D-2 to D-11 were manufactured in the manner similar to the cell D-1. These cells were charged to 4.3 V and maintained for one month at 50° C. After one month, the cells were discharged to 2.7 V. The discharge capacities of these cells are shown in Table 6. The discharge capacity is represented by a relative value with respect to that of the cell D-5.

TABLE 6

Cell Performance

| Cell No. | Positive Electrode No. | Discharge Capacity Relative Value |
|---|---|---|
| D-1 | C-1 | 60 |
| D-2 | C-2 | 87 |
| D-3 | C-3 | 91 |
| D-4 | C-4 | 96 |
| D-5 | C-5 | 100 |
| D-6 | C-6 | 99 |
| D-7 | C-7 | 97 |
| D-8 | C-8 | 99 |
| D-9 | C-9 | 96 |
| D-10 | C-10 | 94 |
| D-11 | C-11 | 75 |

The positive electrode C-1 used for the cell D-1 both have the same thickness of 250 $\mu$m as the central area thickness d of the electrode depolarizing mix layer and as the tip portion thickness d0 thereof, and the thickness of this layer is uniform over the whole length. The positive electrodes C-2 to C-11 used for the cells D-2 to D-11 have the film thickness d0 at the tip portion thicker than d. As compared to the cell D-1, the cells D-2 to D-11 have a relatively large discharge capacity. It is preferable that the film thickness d0 at the tip portion is greater than the film thickness d at the central area (an average thickness of the electrode depolarizing mix layer), because the discharge capacity is large.

As compared to the cells D-2 to D10, the positive electrode C-11 used for the cell D-11 has the film thickness 320 $\mu$m at the tip portion thicker than the film thickness d 250 $\mu$m at the central area by 28% and has a smaller discharge capacity. The cells D-2 to D-10 having the film thickness d0 at the tip portion thicker than the film thickness d (average thickness of the electrode depolarizing mix layer) by 2% to 25% is more preferable because the discharge capacity is large. It is preferable that the film thickness d0 at the tip portion is thicker than the film thickness d at the central area by 2% to 25%.

The positive electrode C-3 used for the cell D-3 has a distance L of 10 mm to the peak position, which distance is longer than the other cells D-4 to D-10. The cell D-3 having a longer distance L is not preferable because it has a smaller discharge capacity as compared to the other cells D-4 to D-10. The cells D-4 to D-10 having a distance of 5 mm or shorter is preferable because they have a larger discharge capacity.

The cell performance changes with a ratio S1/S2 which is an area ratio shown in FIG. 2B. The cell D-4 having a ratio S1/D2 of 10 has a smaller discharge capacity than the cell D-5 having a ratio S1/S2 of 2. The cells having a ratio S1/S2 of 0.5 to 5 are preferable because they have a larger discharge capacity.

As different from the other cells D-3 to D-10, the positive electrode C-2 used for the cell D-2 has a protrusion (with a small radius of curvature) on the tip portion. The cells D-3 to D-10 have a larger radius of curvature of contour near at the peak. As compared to the other cells D-3 to D-11, the cell having the protrusion is not preferable because it has a smaller discharge capacity. As compared to the other cells D-4 to D-10, the cell D-3 having too large a radius of curvature (5d) is not preferable because it has a smaller discharge capacity. The cells D-4 to D-10 having the radius of curvature of contour near at the peak as large as 1/8 to 4 times of the film thickness d at the central area (average thickness of the electrode depolarizing mix layer) are preferable because they have a larger discharge capacity.

Next, a method of manufacturing a stripe electrode sheet according to an embodiment of the invention and manufacture apparatuses suitable for performing the manufacture method will be described with reference to FIGS. 5 to 12.

The stripe electrode sheet manufacture method includes the following processes to be sequentially performed.

Figure 8:
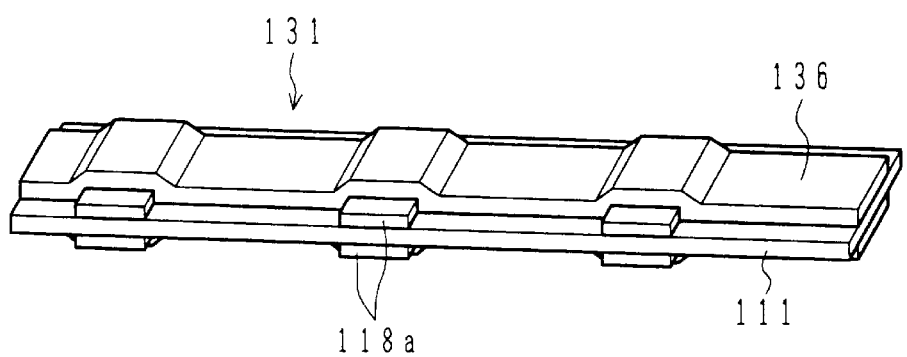
FIG. 8 is a conceptual diagram showing an example of the structure of a stripe conductive sheet bonded with an adhesive tape piece and having a stacked depolarizing mix layer.

1st Process: As shown in FIG. 8, adhesive tape pieces 118a are sequentially bonded to a strip conductive sheet 111 on at least one surface thereof in the traverse (width) direction of the sheet 111 at a predetermined interval therebetween in the longitudinal direction of the sheet 111 (adhesive tape bonding process).

Figure 10A:
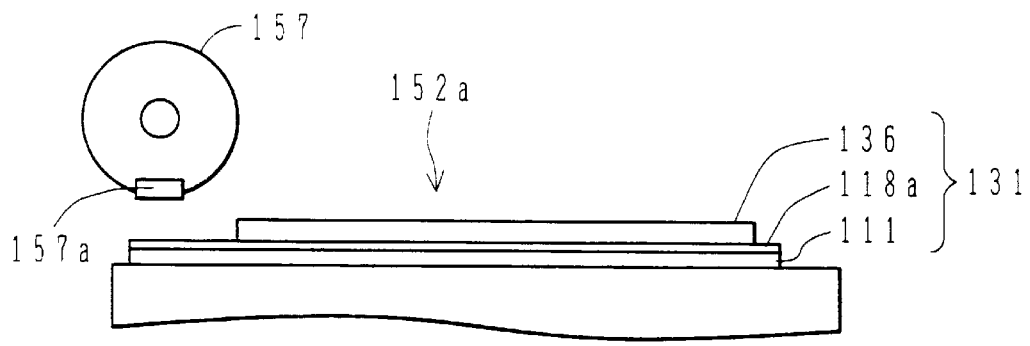
FIGS. 10A to 10D are diagrams showing an example of the details of the adhesive tape piece peel-off apparatus.

2nd Process: As shown in FIG. 10A, electrode depolarizing mix solution 136 is coated on the surface of the stripe conductive sheet 111 where the adhesive tape piece 118a was bonded, excepting the side portions of the sheet 111 and exposing at least one end portion (under a drum 157) of the adhesive tape sheet 118a along the traverse direction of the sheet 111, and heated and dried (depolarizing mix layer forming process).

Figure 10B:
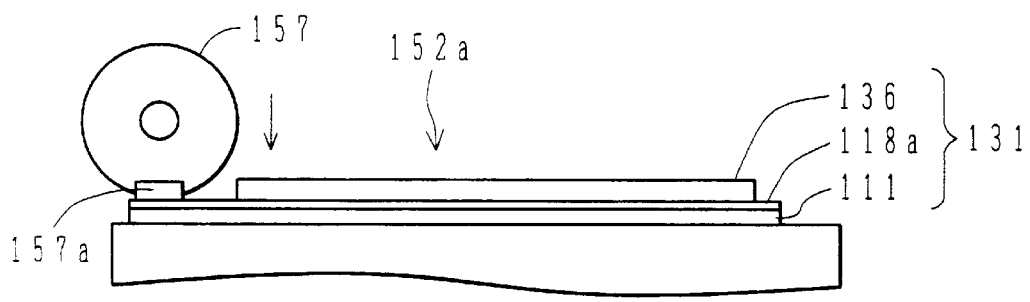
Figure 10C:
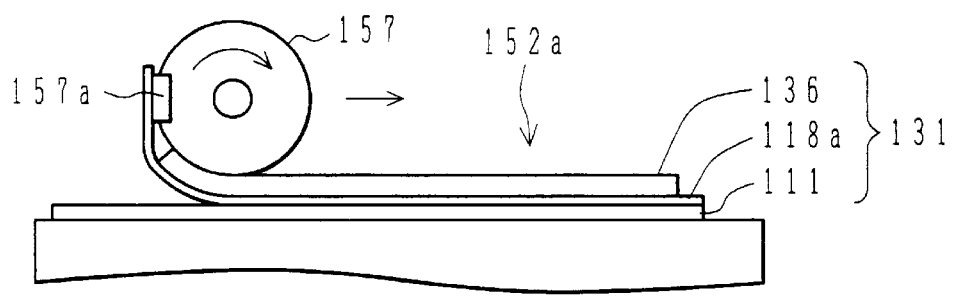
Figure 10D:
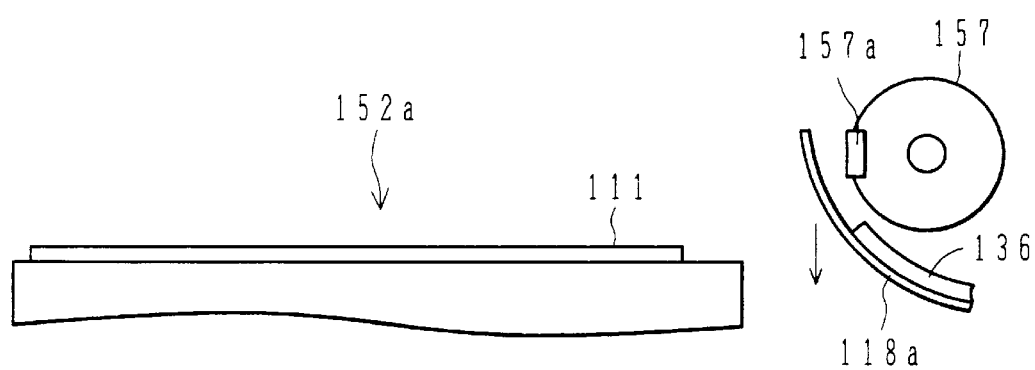

3rd Process: As shown in FIGS. 10B to 10D, the exposed end portion of the adhesive tape piece 118a is held and pulled up along the traverse direction of the sheet 111 to peel off the adhesive tape piece 118a (adhesive tape peel-off process).

The materials of the stripe conductive sheet and electrode depolarizing mix layer may be selected from known materials which are described previously.

The adhesive tape piece provides a so-called masking tape function, and is generally made of resin material such as polyolefine such as polyethylene and polypropylene, and polyester such as polyvinyl chloride and poplyethylene terephthalate. An adhesive layer is formed on one surface of the adhesive tape piece. Various types of adhesive agents are already known and any one of may be used as desired. It is however preferable that adhesive agent has a proper adhesion force so as to make it easy to peel off the adhesive tape piece from the stripe conductive sheet during the adhesive tape peel-off process. The adhesion force is preferably 100 g/20 mm or smaller as measured by a 180-degree peel-apart method. It is also preferable that the adhesive agent has the characteristics that the adhesion force lowers at the heating temperature during the heating/dry process to be performed for the strip conductive sheet coated with the electrode depolarizing mix layer after forming the adhesive tape piece is bonded.

In order to help electrode depolarizing mix solution be uniformly coated on the surface of the stripe conductive sheet bonded with the adhesive tape piece, the surface of the conductive sheet and the top surface of the adhesive tape piece (on the surface not formed with the adhesive layer) are preferably activated, for example, by corona discharge. This corona discharge process may be performed off-line beforehand for the surface of the conductive sheet and the top surface of the adhesive tape piece (on the surface not formed with the adhesive layer).

Figure 5:
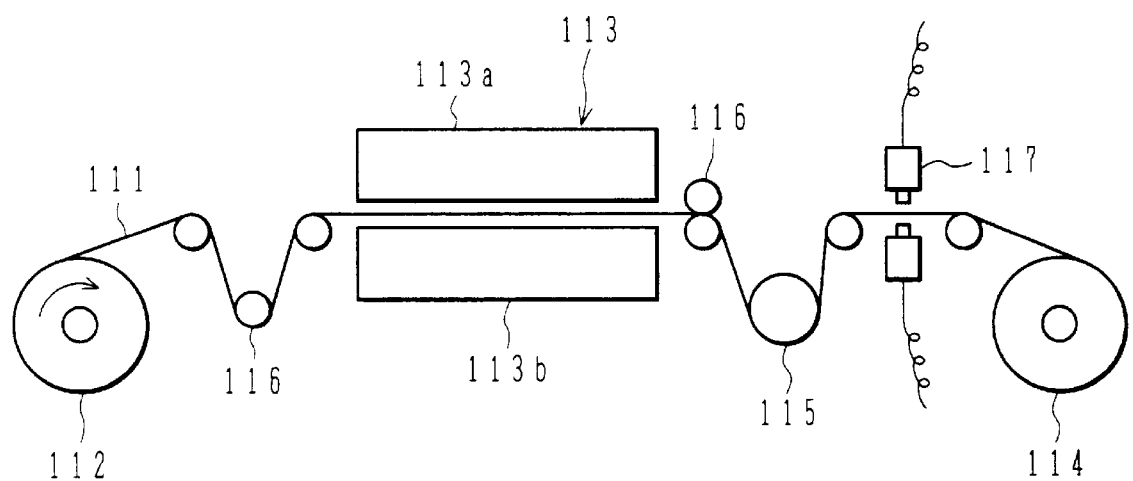
FIG. 5 is a diagram showing an example of the structure of an adhesive tape piece bonding apparatus.

FIG. 5 shows the overall structure of a system (adhesive tape bonding system) for performing the first process (adhesive tape bonding process).

The basic structure of the adhesive tape bonding system has a conductive sheet feeding roller 112 for feeding the stripe conductive sheet (current collector) 111, a tape bonding unit 113 for sequentially bonding adhesive tape pieces on the surface of the conductive sheet 111 along its width direction, and a winding roller 114 for winding and taking up the conductive sheet 111 bonded with adhesive tape pieces.

Although the tape bonding unit 113 has two tape bonding sub-units 113a and 113b in order to bond adhesive tape pieces on both front (upper) and bottom (lower) surfaces of the conductive sheet 111, it may obviously be provided with only one sub-unit. A motor 115 for helping the conductive sheet 111 transport and a plurality of feed supporting rollers 116 may be provided, if necessary, between the conductive sheet feeding roller 112 and winding roller 114. A sensor (e.g., laser displacement gauge) 117 may be provided for monitoring a bonding state of the adhesive tape piece and detecting defective adhesive tape pieces.

An example of a specific structure of the front surface tape bonding sub-unit 113a of FIG. 5 is shown in FIGS. 6A to 6G which are viewed from the feeding roller 112 side (i.e., showing a traverse cross section of the stripe conductive sheet).

The front surface tape bonding sub-unit 113a is constituted of a tape roller 119 for feeding the adhesive tape 118, a small area plate (upper preliminary suction plate) 120a formed at its bottom with a suction surface having a number of air inlet holes, a small area plate (lower preliminary suction plate) 120b positioned lower than the preliminary suction upper plate 120a and formed at its top with a suction surface having a number of air inlet holes, an elongated plate (tape suction plate) 121 formed at its bottom with a suction surface having a number of air inlet holes, and a cutter 122 for cutting the adhesive tape 118 at a predetermined position.

Figure 6A:
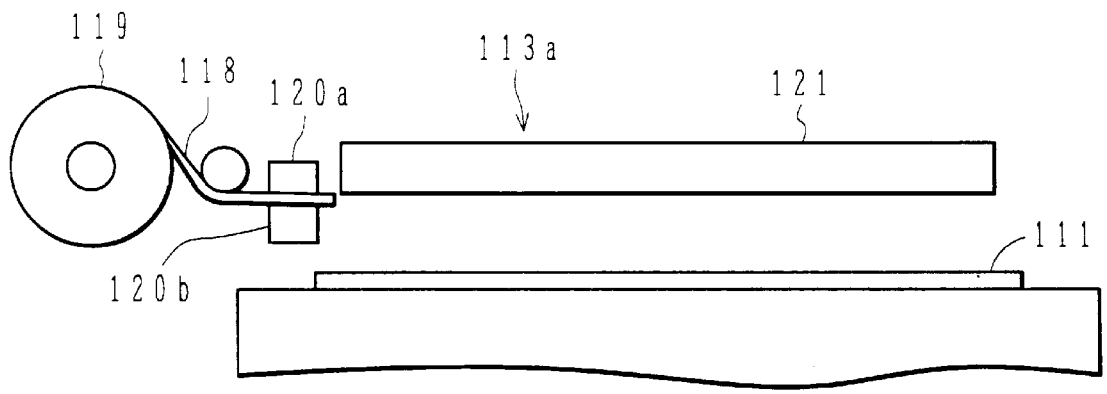
FIGS. 6A to 6C are diagrams showing an example of the details of the adhesive tape piece bonding apparatus.
Figure 6B:
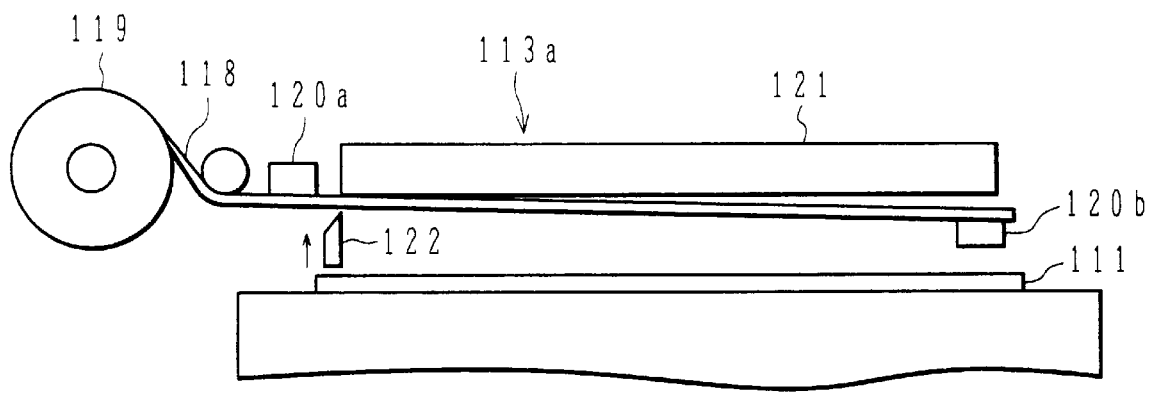
Figure 6C:
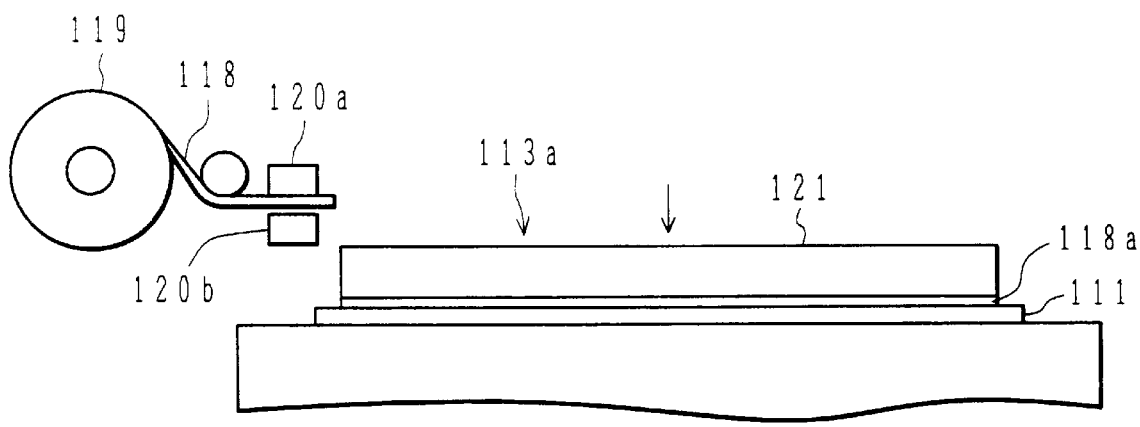

In the first process (adhesive tape bonding process), the stripe conductive sheet 111 fed by the conductive sheet feeding roller 112 stops temporarily, and the adhesive tape 118 fed by the tape roller 119 is temporarily squeezed between the upper and lower preliminary suction plates 120a and 120b (refer FIG. 6A). Next, after the suction function of the upper preliminary suction plate 120a is released, the lower preliminary suction plate 120 is moved forward along the longitudinal direction (lateral direction in FIG. 6B) of the tape suction plate 121 to thereby transport the front end of the adhesive tape 118 to the lower front end of the tape suction plate 121. At this position, the adhesive tape 118 is sucked and fixed to the bottom surface of the tape suction plate 121, and nearly at the same time the adhesive tape 118 is cut with the cutter 122 at the position near the back end of the tape suction plate 121 (refer to FIG. 6B).

Next, the lower preliminary suction plate 120b returns to the original position, and the tape suction plate 121 moves down to press the bottom surface of the cut adhesive tape (adhesive tape piece) 118a against the upper surface of the conductive sheet 111. When the suction function of the tape suction plate 121 is released, the adhesive tape piece 118a is bonded to the upper surface of the conductive sheet 111 (refer to FIG. 6C). Lastly, the tape suction plate 121 moves to the original position to prepare for the next bonding process (FIG. 6A).

Figure 7:
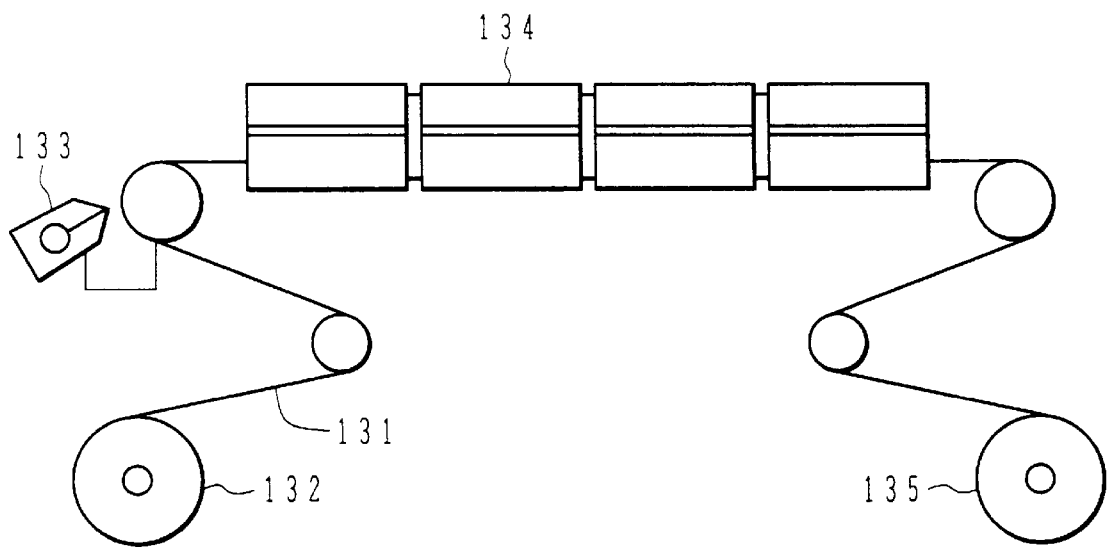
FIG. 7 is a diagram showing an example of the structures of a depolarizing mix solution supplying apparatus for forming a depolarizing mix layer and a heating/drying apparatus.

FIG. 7 shows the overall structure of an apparatus for performing the second process (depolarizing mix layer forming process) in which electrode depolarizing mix solution is coated on the surface of the conductive sheet (on the surface bonded with the adhesive tape piece) and thereafter heated and dried.

Such an electrode depolarizing mix layer forming apparatus is described, for example, in JP-A-HEI-8-45501 which is herein incorporated by reference. The structure of this apparatus will be described briefly.

The depolarizing mix layer forming apparatus is constituted of a feeding roller 132 for feeding the stripe conductive sheet 131 bonded with the adhesive tape piece, a coater 133 for coating electrode depolarizing mix solution on the surface of the stripe conductive sheet 131 (on the surface bonded with the adhesive tape piece), a heating/dry unit 134 (usually having a plurality of heating/dry zones in order to control heating/dry conditions) for drying the stripe conductive sheet 131 coated with the electrode depolarizing mix solution, and a winding roller 135 for winding and taking up the stripe conductive sheet 131 having the electrode depolarizing mix layer heated and dried.

FIG. 8 is a perspective view of the stripe conductive sheet 131 having adhesive tape pieces 181 and the electrode depolarizing mix layer 136 formed by the second process.

Figure 9:
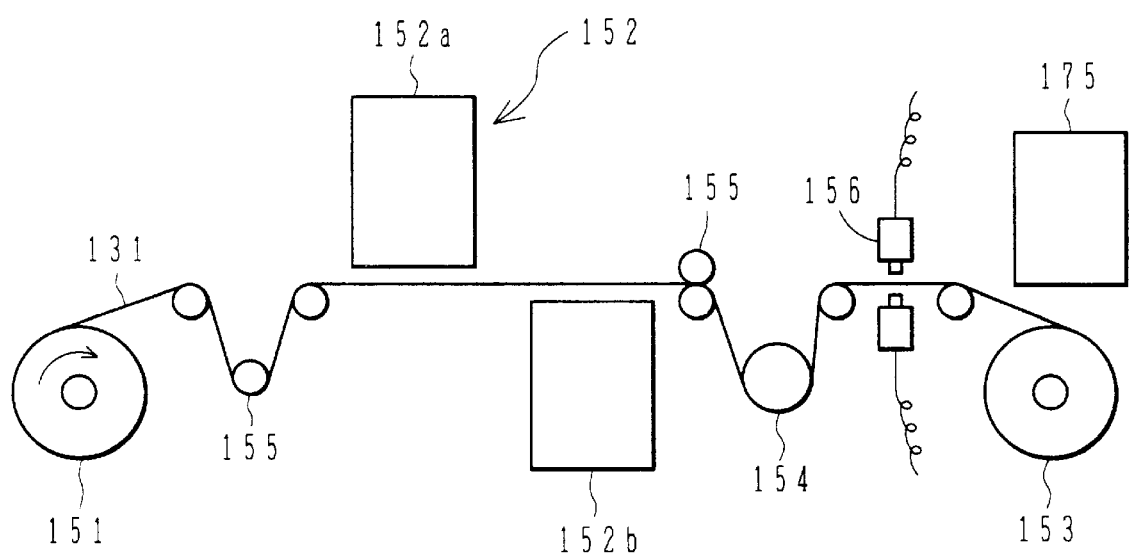
FIG. 9 is a diagram showing an example of the structure of an adhesive tape piece peel-off apparatus.

FIG. 9 shows the overall structure of an apparatus for performing the third process (adhesive tape peel-off process) in which the adhesive tape piece is peeled off by holding the exposed end portion of the piece and pulling up it in the traverse direction of the stripe conductive sheet.

The basic structure of the adhesive tape peel-off apparatus is constituted of a conductive sheet feeding roller 151 for feeding the stripe conductive sheet 131 with a stacked electrode depolarizing mix layer, a tape peel-off unit 152 for sequentially peeling off adhesive tape pieces from the surface of the conductive sheet 131, and a winding roller 153 for winding and taking up the conductive sheet 131 with adhesive tape pieces being peeled off.

Although the tape peel-off unit 152 has two tape bonding sub-units 152a and 152b in order to peel off adhesive tape pieces on both front (upper) and bottom (lower) surfaces of the conductive sheet 131, it may obviously be provided with only one sub-unit. A motor 154 for helping the conductive sheet 131 transport and a plurality of feed supporting rollers 155 may be provided, if necessary, between the conductive sheet feeding roller 151 and winding roller 153. A sensor (e.g., infrared fiber unit) 156 may be provided for monitoring a peel-off state of the adhesive tape piece and detecting defective portions (adhesive tape piece not peeled off, or the like).

Thereafter, a shaping unit 175 shapes, as shown in FIG. 1C, the tip portion 27 of the electrode depolarizing mix layer 24 to provide a smooth convex contour. The shaping unit 175 may be a grinder which can shape the tip portion of the electrode depolarizing mix layer in both the longitudinal and width directions to provide a desired contour.

An example of a specific structure of the front surface tape peel-off sub-unit 152a of FIG. 9 is shown in FIGS. 10A to 10C which are viewed from the feeding roller 151 side (i.e., showing a traverse cross section of the stripe conductive sheet).

The front surface tape peel-off sub-unit 152a is provided with a peel-off drum 157 having a function of peeling off the adhesive tape piece 118a along the traverse direction. The peel-off drum 157 has a suction surface 157a which is made in contact with the exposed area of the tape piece and holds the latter by suction force (FIG. 10A). As the adhesive tape piece 118a of the stripe conductive sheet 131 with the stacked electrode depolarizing mix layer 136 stops under the drum 157, the peel-off drum 157 lowers and its suction surface 157a becomes in contact with the exposed area of the adhesive tape piece 118a to hold it by suction force (FIG. 10B).

Next, while the tape piece peel-off drum 157 holds the exposed area of the adhesive tape piece 118a, it rotates and moves along the width direction (traverse direction) of the stripe conductive sheet 131 (FIG. 10C). After the tape piece peel-off drum 157 peels off the adhesive tape piece 118a by moving to the opposite side of the stripe conductive sheet 131, the suction function of the suction surface 157a is released (FIG. 10D). After this peel-off process, the tape piece peel-off drum 157 moves to the initial position (FIG. 10A).

The stripe conductive sheet with the adhesive tape piece being peeled off (a sheet having on its surface the electrode depolarizing mix layer partitioned by the adhesive tape piece peeled-off area, i.e., a stripe electrode sheet) is then wound about the winding roller 152.

In FIGS. 10A to 10D, although the adhesive tape peel-off apparatus uses the peel-off drum, other peel-off methods may be used. For example, another adhesive tape having a stronger adhesion force may be bonded to the exposed area of the adhesive tape piece and to the area over the hidden adhesive tape piece, and this other adhesive tape is peeled off together with the adhesive tape piece.

Figure 11:
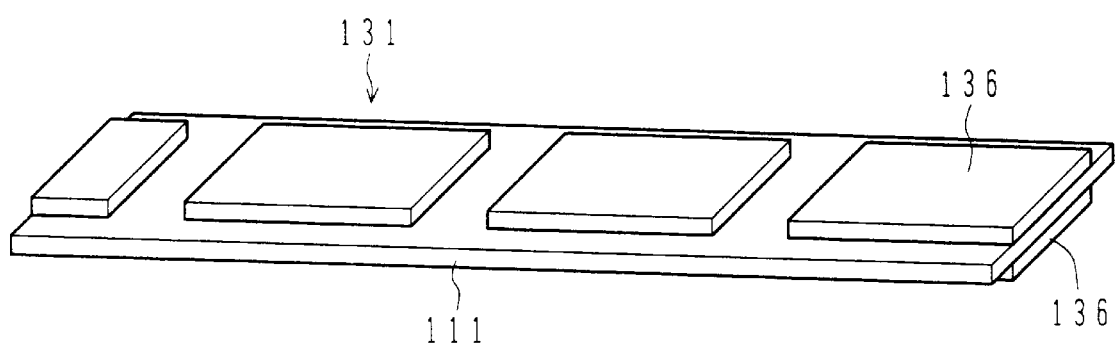
FIG. 11 is a conceptual diagram showing an example of a stripe electrode sheet.

FIG. 11 is a perspective view of the stripe electrode sheet 131 manufactured by the above processes wherein reference numeral 111 represents the stripe conductive sheet and reference numeral 136 represents the electrode depolarizing mix layer.

Figure 12:
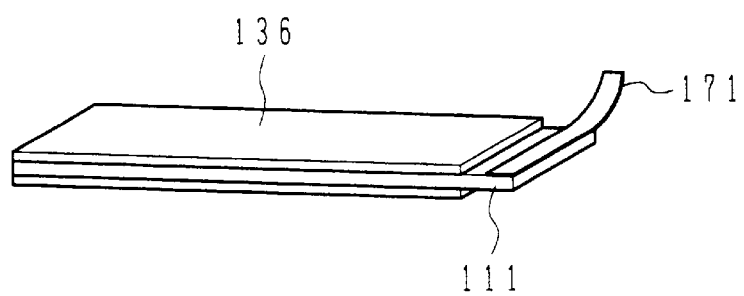
FIG. 12 is a conceptual diagram showing an example of the structure of an electrode sheet piece.

The stripe electrode sheet 131 shown in FIG. 11 is cut at the adhesive tape peeled-off area. A lead plate 171 is connected to the exposed surface of the conductive sheet near the cut portion to complete a electrode sheet such as shown in FIG. 12 to be housed in a non-aqueous secondary cell.

4th Embodiment

Stripe electrode (positive electrode) sheets having excellent shape and thickness uniformity were manufactured by using the stripe electrode sheet manufacture apparatuses shown in FIGS. 5, 6A to 6C, 7, 9, and 10A to 10D and by using the following stripe conductive sheets, adhesive tapes and electrode depolarizing mix materials.

Stripe conductive sheet: aluminum sheet (20 $\mu$m thick)

Base material of adhesive tape: polyethylene terephthalate (35 $\mu$m thick and 40 mm wide)

Adhesive agent of adhesive tape: acrylic-containing adhesive agent (adhesion force of 7 g/20 mm by 180-degree peel-apart)

Components of electrode depolarizing mix (positive electrode): $LiCoO_2$ (61 parts by weight), acetylene black (2 parts by weight), styrene-butadiene rubber (2 parts by weight), carboxymethyl cellulose (24 parts by weight, 1.2% solution)

Bonding interval of adhesive tape pieces: 500 mm

5th Embodiment

Stripe electrode (positive electrode) sheets having excellent shape and thickness uniformity were manufactured by using the stripe electrode sheet manufacture apparatuses shown in FIGS. 5, 6A to 6C, 7, 9, and 10A to 10D and by using the following stripe conductive sheets, adhesive tapes and electrode depolarizing mix materials.

Stripe conductive sheet: aluminum sheet (20 $\mu$m thick)

Base material of adhesive tape: polyethylene (75 $\mu$m thick and 40 mm wide)

Adhesive agent of adhesive tape: adhesive agent (adhesion force of 7 g/20 mm by 180-degree peel-apart)

Components of electrode depolarizing mix (positive electrode): $LiCoO_2$ (61 parts by weight), acetylene black (2 parts by weight), styrene-butadiene rubber (2 parts by weight), carboxymethyl cellulose (24 parts by weight, 1.2% solution)

Bonding interval of adhesive tape pieces: 500 mm

6th Embodiment

Stripe electrode (negative electrode) sheets having excellent shape and thickness uniformity were manufactured by using the stripe electrode sheet manufacture apparatuses shown in FIGS. 5, 6A to 6C, 7, 9, and 10A to 10D and by using the following stripe conductive sheets, adhesive tapes and electrode depolarizing mix materials.

Stripe conductive sheet: copper sheet (18 $\mu$m thick)

Base material of adhesive tape: polyethylene terephthalate (35 $\mu$m thick and 18 mm wide)

Adhesive agent of adhesive tape: acrylic-containing adhesive agent (adhesion force of 7 g/20 mm by 180-degree peel-apart)

Components of electrode depolarizing mix (negative electrode): $LiCoVO_4$ (86 parts by weight), acetylene black (3 parts by weight), styrene-butadiene rubber (2 parts by weight), carboxymethyl cellulose (24 parts by weight, 1.2% solution)

Bonding interval of adhesive tape pieces: 500 mm

With the above stripe electrode sheet manufacture method, strip electrode sheets having excellent shape and thickness uniformity can be manufactured efficiently and with high reliability.

The present invention has been described in connection with the preferred embodiments. The invention is not limited only to the above embodiments. It is apparent that various modifications, improvements, combinations, and the like can be made by those skilled in the art.

We claim:

1. A cell electrode of a stripe rectangle shape having an electrode depolarizing mix layer provided on a current collector, wherein the electrode depolarizing mix layer has two end portions which are (1) formed on respective tip portions of the electrode in a longitudinal direction of the electrode, and (2) thicker than an average thickness of the electrode depolarizing mix layer by 2 to 25%.

2. A cell electrode of a stripe rectangle shape having an electrode depolarizing mix layer provided on a current collector, wherein the electrode depolarizing mix layer has two end portions which are (1) formed on respective side end portions of the electrode in a width direction of the electrode, and (2) thicker than an average thickness of the electrode depolarizing mix layer by 2 to 25%.

3. A cell electrode of a stripe rectangle shape having an electrode depolarizing mix layer provided on a current collector, wherein the electrode depolarizing mix layer has end portions which are (1) formed on respective tip portions of the electrode in a longitudinal direction of the electrode and on respective side end portions of the electrode in a width direction of the electrode, and (2) thicker than an average thickness of the electrode depolarizing mix layer by 2 to 25%.

4. A cell electrode according to claim 1, wherein a thickness of the electrode depolarizing mix layer at one end portion is thicker than an average thickness of the electrode depolarizing mix layer by 5 to 20%.

5. A cell electrode according to claim 1, wherein a distance between a peak position of one end portion and an end position of the electrode depolarizing mix layer is 10 mm or shorter.

6. A cell electrode according to claim 1, wherein a rise angle of a contour of one end portion is 30 degrees or larger.

7. A cell electrode according to claim 1, wherein the electrode depolarizing mix layer contains positive electrode active material.

8. A cell electrode according to claim 1, wherein a border line of a surface of the current collector in contact with one side line of the electrode depolarizing mix layer is generally perpendicular to a longitudinal direction of the rectangular electrode.

9. A cell electrode according to claim 1, wherein the average thickness of the electrode depolarizing mix layer is 30 $\mu$m or thicker and 400 $\mu$m or thinner.

10. A cell electrode according to claim 3, wherein a width of one end portion is 20 mm or narrower in the longitudinal direction and 10 mm or narrower in a width direction.

11. A cell electrode according to claim 5, wherein if a cross section of the electrode depolarizing mix layer is approximated to a rectangle having a height equal to the average thickness of the electrode depolarizing mix layer, one side of the rectangle rising upright at a peripheral end point of one end portion, an area S1 of the one end portion of the electrode depolarizing mix layer outside of the rectangle is 0.5 times or more or 5 times or less relative to an area S2 of the rectangle not including the one end portion.

12. A cell electrode according to claim 7, wherein the positive electrode active material contains at least one material selected from a compound group consisting of $Li_xCoO_2$, $Li_xNiO_2$, $Li_xCo_aNi_{1-a}O_2$, $Li_xCo_bV_{1-b}O_z$, $Li_xCo_bFe_{1-b}O_z$, $Li_xMn_2O_4$, $Li_xMnO_2$, $Li_xMn_2O_3$, $Li_xMn_bCo_{2-b}O_z$, $Li_xMn_bNi_{2-b}O_z$, $Li_xMn_bV_{2-b}O_z$ and $Li_xMn_bFe_{1-b}O_z$ (wherein x=0.05 to 1.2, a=0.1 to 0.9, b=0.8 to 0.98 and z=1.5 to 5).

13. A secondary cell comprising:

a first electrode of a rectangle shape having an electrode depolarizing mix layer provided on a current collector, the electrode depolarizing mix layer having two thick end portions which are thicker than an average thickness of the electrode depolarizing mix layer by 2 to 25%;

a second electrode of a rectangle shape having an electrode depolarizing mix layer on a current collector and an opposite polarity to the first electrode;

a separator provided between the first and second electrodes;

a container housing the first electrode, the second electrode, and the separator; and an electrolyte poured into the container;

wherein the electrolyte is non-aqueous.

14. A secondary cell according to claim 13, wherein the first electrode is a positive electrode and the second electrode is a negative electrode.

15. A secondary cell according to claim 14, wherein a length and a width of the electrode depolarizing mix layer of the first electrode is smaller than a length and a width of the electrode depolarizing mix layer of the second electrode.

16. A cell electrode according to claim 2, wherein a thickness of the electrode depolarizing mix layer at one end portion is thicker than an average thickness of the electrode depolarizing mix layer by 5 to 20.

17. A cell electrode according to claim 2, wherein a distance between a peak position of one end portion and an end position of the electrode depolarizing mix layer is 10 mm or shorter.

18. A cell electrode according to claim 2, wherein a rise angle of a contour of one end portion is 30 degrees or larger.

19. A cell electrode according to claim 2, wherein the electrode depolarizing mix layer contains positive electrode active material.

20. A cell electrode according to claim 2, wherein a border line of a surface of the current collector in contact with one side line of the electrode depolarizing mix layer is generally perpendicular to a longitudinal direction of the rectangular electrode.

21. A cell electrode according to claim 2, wherein the average thickness of the electrode depolarizing mix layer is 30 μm or thicker and 400 μm or thinner.

22. A cell electrode according to claim 19, wherein the positive electrode active material contains at least one material selected from a compound group consisting of $Li_xCoO_2$, $Li_xNiO_2$, $Li_xCo_aNi_{1-a}O_2$, $Li_xCo_bV_{1-b}O_z$, $Li_xCo_bFe_{1-b}O_z$, $Li_xMn_2O_4$, $Li_xMnO_2$, $Li_xMn_2O_3$, $Li_xMn_bCo_{2-b}O_z$, $Li_xMn_bNi_{2-b}O_z$, $Li_xMn_bV_{2-b}O_z$ and $Li_xMn_bFe_{1-b}O_z$ (wherein x=0.05 to 1.2, a 0.1 to 0.9, b=0.8 to 0.98 and z=1.5 to 5).

23. A cell electrode according to claim 3, wherein a distance between a peak position of one end portion and an end position of the electrode depolarizing mix layer is 10 mm or shorter.

24. A cell electrode according to claim 23, wherein if a cross section of the electrode depolarizing mix layer is approximated to a rectangle having a height equal to the average thickness of the electrode depolarizing mix layer, one side of the rectangle rising upright at a peripheral end point of one end portion, an area S1 of the one end portion of the electrode depolarizing mix layer outside of the rectangle is 0.5 times or more or 5 times or less relative to an area S2 of the rectangle not including the one end portion.

25. A cell electrode according to claim 3, wherein the electrode depolarizing mix layer contains positive electrode active material.

26. A cell electrode according to claim 25, wherein the positive electrode active material contains at least one material selected from a compound group consisting of $Li_xCoO_2$, $Li_xNiO_2$, $Li_xCo_aNi_{1-a}O_2$, $Li_xCo_bV_{1-b}O_z$, $Li_xCo_bFe_{1-b}O_z$, $Li_xMn_2O_4$, $Li_xMnO_2$, $Li_xMn_2O_3$, $Li_xMn_bCo_{2-b}O_z$, $Li_xMn_bNi_{2-b}O_z$, $Li_xMn_bV_{2-b}O_z$ and $Li_xMn_bFe_{1-b}O_z$ (wherein x=0.05 to 1.2, a 0.1 to 0.9, b=0.8 to 0.98 and z=1.5 to 5).

* * * * *